(12) United States Patent
Russell

(10) Patent No.: US 6,659,133 B2
(45) Date of Patent: Dec. 9, 2003

(54) INSERTABLE LINE STOPPER PLUG FOR PIPELINES

(76) Inventor: Larry R. Russell, 3607 Gramercy, Houston, TX (US) 77025-1320

( * ) Notice: Subject to any disclaimer, the term of this patent is extended or adjusted under 35 U.S.C. 154(b) by 128 days.

(21) Appl. No.: 10/061,760

(22) Filed: Feb. 1, 2002

(65) Prior Publication Data

US 2002/0106247 A1 Aug. 8, 2002

Related U.S. Application Data

(60) Provisional application No. 60/266,746, filed on Feb. 6, 2001.

(51) Int. Cl.[7] ............................................... F16L 55/10
(52) U.S. Cl. ............................. 138/94; 138/95; 251/168
(58) Field of Search .......................... 138/94, 94.3, 94.5, 138/95; 251/168, 194, 197, 198

(56) References Cited

U.S. PATENT DOCUMENTS

| | | | | |
|---|---|---|---|---|
| 2,198,639 A | * | 4/1940 | Stines ........................... | 251/167 |
| 2,664,262 A | * | 12/1953 | Mueller et al. .............. | 251/187 |
| 2,906,295 A | | 9/1959 | Ver Nooy | |
| 3,025,885 A | | 3/1962 | Ver Nooy | |
| 3,370,614 A | | 2/1968 | Koppl | |
| 3,626,475 A | | 12/1971 | Hicks | |
| 3,774,647 A | * | 11/1973 | Saha et al. ................... | 138/94.3 |
| 4,202,377 A | * | 5/1980 | Harrison ...................... | 138/94 |
| 4,291,727 A | | 9/1981 | Yie et al. | |
| 5,082,026 A | * | 1/1992 | Smith ........................... | 138/94 |
| 5,083,582 A | * | 1/1992 | Lawson ..................... | 137/454.6 |
| 5,186,199 A | | 2/1993 | Murphy et al. | |
| 5,297,581 A | * | 3/1994 | Godfrey ....................... | 138/94 |

OTHER PUBLICATIONS

International Piping Services Company, IPSCO's Hot Tapping and Line Stopping Services are used Around the World, 2000.
International Piping Services Company, FloStop II, 2000.
International Piping Services Company, LIne Stopping Heads, 2000.
International Piping Services Company, Sealing Elements, 2000.
T.D. Williamson, Inc., Shortstopp II, Jan. 1996.
T.D. Williamson, Inc., Stopple Plugging Machines, 1996.
T.D. Williamson, Inc., TDW Services, Inc., Hot Tapping and Line Plugging, 1996.

* cited by examiner

Primary Examiner—James Hook
(74) Attorney, Agent, or Firm—Elizabeth R. Hall

(57) ABSTRACT

This invention contemplates a resettable plug assembly suitable for insertion into a pipeline from a transverse tee connection in order that flow may be stopped and pressure retained by the plug. The stopper plug is inserted in the upstream direction and utilizes a bypass valve to aid installation when there is flow. The seal of the plug is expanded radially to contact the wall of the pipeline for sealing. Once in place the bypass valve is closed to stop the flow in the pipeline.

41 Claims, 14 Drawing Sheets

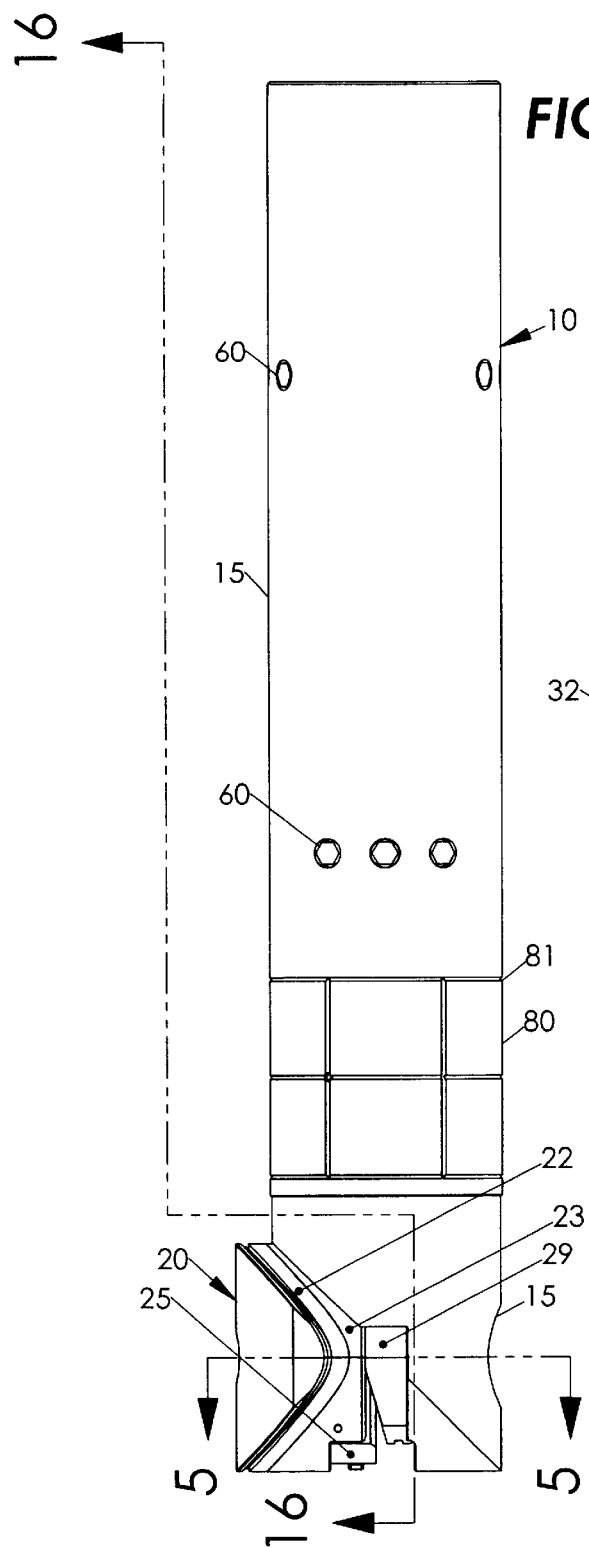
FIGURE 8
FIGURE 16
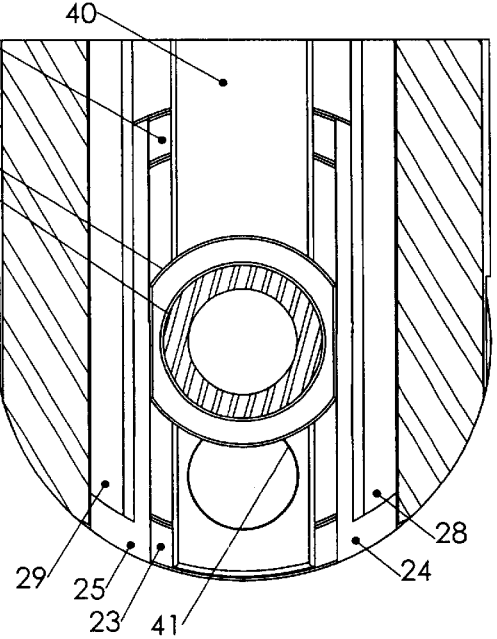

INSERTABLE LINE STOPPER PLUG FOR PIPELINES

CROSS-REFERENCE TO RELATED APPLICATION

The present application, pursuant to 35 U.S.C. 111(b), claims the benefit of the earlier filing date of provisional application Ser. No. 60/266,746 filed Feb. 6, 2001, and entitled "Insertable Line Stopper Plug for Pipelines." The present invention is also related to the patent application Ser. No. 09/788,970 filed Feb. 19, 2001 entitled "Antiextrusion Device" and the patent application 60/041,729 filed Jan. 8, 2002 entitled "Pressure Containing Plug for a Tubular Passageway."

BRIEF DESCRIPTION OF THE INVENTION

The present invention relates in general to a resettable plug assembly suitable for insertion into a pipeline from a transverse tee connection and through a cut window in the pipeline in order that flow may be stopped and pressure retained by the plug. More particularly, the invention relates to a remotely installable and removable line stopper plug for pipelines.

BACKGROUND OF THE INVENTION

When repairing pipelines, it is often necessary to stop flow in the pipeline and isolate the pressure by inserting a plug into the line from a hot-tapped tee connection. Various line stoppers have been developed and been widely applied, but these conventional line stoppers are generally limited both in their ability to handle high pressures and their reliability.

One means of line stopping is to insert a deflated bladder into the pipeline to one side of a hot-tapped window in the line and then inflate it to a pressure in excess of the ambient pressure. This approach is simple and does not require a fall-size window to be cut in the pipe, but it is limited in the pressure range that it can accommodate by the bursting capacity of the bladder. In order to ensure sealing, the bladder inflation pressure must be in excess of the highest pressure to which it will be exposed. If the pressure on the downstream side of the bladder is sufficiently lower than the inflation pressure, then the bladder will burst. An additional problem is that the bladder is difficult to emplace and to inflate and deflate in a flowing line.

A second means of line stopping is the T.D.W. Product "Shortstopp II"™ plugging system device, in which a disk with a peripheral cup seal is mounted on a lever which has a fulcrum at the outer tee end of the hot tap fitting. The disk is inserted through the bore of the tee and then pivoted into the line downstream of the window in the pipe. Both solid disks and hinged disks are used; the hinged disks have an additional seal between the hinged halves. The hinged disks can be inserted through a window less than the pipeline bore. The primary problem with this disk arrangement is that the seal is wiped across the periphery of the window cut in the pipe, exposing it to a high likelihood of damage from burrs. Plug insertion is prone to shock loads if the line is flowing, and withdrawal against pressure is difficult. Cup seals can also invert and fail to seal in cases where there is high flow.

Another version of a line stopper with a disk plug using a cup seal is the IPSCO "FloStopII"™ pivoting head line stop. This device has a disk with a rotation axis mounted transverse to and to one side of the disk axis and offset from the plane of the disk. The disk rotation axis is also transverse to both the pipeline axis and the insertion tee axis. Offset from the plane of the disk on the opposite side from the pivot axis is a roller with its axis parallel to the disk rotation axis. The disk is depended from an insertion head that is forced through the tee of the hot tap fitting toward the pipeline axis. When the roller of the disk contacts the pipe wall opposite the window cut in the pipe, it is forced because of the offset between the hinge axis and the roller axis to pivot into a position transverse to its axis of insertion and enter the pipeline to the side of the window. This device is more controllable during insertions and removals in flowing conditions, but it still has the problem of the seal sliding over the burrs on the interior of the window opening and the possibility of seal cup inversion.

IPSCO also has a "FloStopII"™ cylindrical rubber plug which is inserted into a hot tap fitting through a full bore size window and bottomed out on the opposed cylindrical pipeline wall opposite the tee. Application of axial compression to the rubber cylinder by a hydraulic cylinder causes it to expand radially so that a seal is made with the pipe bore and the edge of the window. The disadvantages of this device are its low pressure rating and the need for an on-center window cut without major burrs.

IPSCO has a folding head line stop which is inserted into a line similarly to the pivoting head line stop, but is first hydraulically unfolded and then caused to move into the downstream portion of the pipe by shoving downwardly on a four-bar linkage. This mechanism will not slam open during deployment, but its seal still wipes across the pipe bore and it may be difficult in a flowing line to refold the head for retrieval.

IPSCO has two other line stops which require that the line be totally cut oversized on both sides on a transverse axis. These devices both require a sufficient connection to be provided between the cut ends of the pipe by the hot-tap fitting. For the first of these devices, the "Sure-Stop"™, a cylindrical rubber sleeve is axially compressed by conical nuts with opposed threads which are driven by rotation of a shaft coaxial with the rubber sleeve. The axial compression causes the sleeve to pack off against the arcuate cut ends of the pipe. This device is capable of handling only low pressures and is subject to seal cutting on the machined edges of the pipe. The second device, the "HTP Stop"™, uses semicylindrical metal shells which are expanded against the cut ends of the pipe by the same double conical nut method as for the "Sure-Stop". Metal-to-metal sealing is provided on the upstream side of the cut; evidently elastomeric seals are used on the downstream side. The metal-to-metal seal has high pressure and temperature capability, but the necessary seal interface forces are very high, necessitating a particularly strong hot-tap fitting and very high actuation forces. The metal-to-metal seal may be temperature sensitive and is hard to make reliable. The arcuate cut face of the pipeline must also be sufficiently smooth and regular to permit sealing.

Thus, a need exists for a plug suitable for sealing a bore against high pressures that can easily be installed or removed by robots and remote manipulators.

A further need exists for a passive bi-directional seal having significant preloading contact with the bore, which is not scuffed during its installation.

SUMMARY OF THE INVENTION

This invention contemplates a resettable plug assembly suitable for insertion into a pipeline from a transverse tee connection in order that flow may be stopped and pressure retained by the plug. The stopper plug is inserted in the upstream direction and utilizes a bypass valve to aid installation when there is flow. The seal of the plug is expanded radially to contact the wall of the pipeline for sealing. Once in place the bypass valve is closed to stop the flow in the pipeline.

One aspect of the present invention is a line stopper apparatus comprising: (a) a substantially tubular housing having a pocket in a first side adjacent to a lower end of said housing; (b) a sealing plug assembly, said sealing plug assembly having a main plug movable between an extended position and a retracted position, wherein when said main plug is in said retracted position the main plug is housed within the pocket of the housing; and an elastomeric seal, wherein the elastomeric seal is decompressed during insertion into a bore of a pipeline; (c) means for moving said main plug between the extended position and the retracted position; and (d) means for compressing said elastomeric seal when emplaced in the bore of the pipeline; whereby the seal is sealingly biased against a bore of a pipeline to stop fluid flow past the line stopper apparatus.

Another aspect of the invention is a line stopper for selectably blocking a hot-tapped tubular flow line, said line stopper comprising: (a) a substantially tubular housing having a pocket in a first side adjacent to a lower end of said housing, said pocket located on a housing diameter transverse to a longitudinal axis of the housing; (b) a through bore at an interior end of the pocket aligned with the pocket and penetrating to a second side of the housing opposed to the first side, wherein the through bore has a counterbore on an external end of the through bore, the counterbore having a shoulder on an inner end of the counterbore; (c) a sealing plug assembly, said sealing plug assembly having a main plug reciprocable along a horizontal axis of the pocket between an extended position and a retracted position, wherein when said main plug is in said retracted position the main plug is housed within the pocket of the housing; an annular elastomeric seal; a pusher ring; an aperture constituting a flow passage in the main plug coaxial with the through bore of the housing; a valve housing attached to an inner end of the main plug, the valve housing having a first flow passage coaxial with the aperture of the main plug and an intersecting transverse passage; a cylindrical extension having an inner flow passage aligned with the through bore of the housing and the aperture of the sealing plug assembly, the cylindrical extension attached to an inner end of the valve housing and reciprocable within the through bore, said cylindrical extension further having an upset head at an outer end of the cylindrical extension, the upset head spaced apart from the shoulder of the counterbore when the main plug is in the retracted position and abutting the shoulder of the counterbore when the main plug is in the extended position; (d) means for moving said main plug between the extended position and the retracted position; (e) means for compressing and decompressing said elastomeric seal; (f) a moveable valving member, said valving member movable between a first position where the valving member permits flow through the flow passage of the valve housing, the inner flow passage of the cylindrical extension and the aperture in the main plug; and a second position where the valving member interacts with the sealing mechanism of the valve housing to prevent through flow through the aperture, the valve housing and the flow passage of the cylindrical extension; and (g) means for moving said valving member into and out of its first flowing position and its second sealing position.

Yet another aspect of the invention is a line stopper having means for injecting and distributing fluid between the housing of the line stopper and a bore of a hot-tap fitting, whereby a lubricating fluid layer is established between the housing and the bore, the lubricating fluid layer facilitating reciprocable insertion and retraction of the line stopper within the hot-tap fitting.

One object of this invention is to provide an improved transversely inserted pipeline line stopper suitable for high pressure service. A further object is to provide a pipeline line stopper which may be readily inserted and removed from a flowing or flow-prone line without experiencing shock loads. Another object is to provide a line stopper with a seal which will not be damaged by sliding against the inside of the pipeline or any burrs thereon. It is also an object of this invention to provide a line stopper with a selectably operated flow bypass. An additional object is to provide a line stopper which can be installed and removed by using either hydraulic or electrical operating means. A further object of this invention is to provide a line stopper which may be robotically and remotely operated.

The foregoing has outlined several aspects of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed might be readily utilized as a basis for modifying or redesigning the structures for carrying out the same purposes as the invention. It should be realized that such equivalent constructions do not depart from the spirit and scope of the invention as set forth in the appended claims.

BRIEF DESCRIPTION OF THE DRAWINGS

The novel features which are believed to be characteristic of the invention, both as to its organization and methods of operation, together with the objects and advantages thereof, will be better understood from the following description taken in conjunction with the accompanying drawings, wherein:

FIG. 8 is a profile view of the line stopper assembly with the sealing plug assembly extended;

FIG. 16 is a partial longitudinal sectional view taken along 16—16 of FIG. 8.

DETAILED DESCRIPTION OF THE INVENTION

The present invention relates to a reliable plug device for sealing an internal tubular passageway. The plug device is particularly applicable for use as a completion plug for pipeline hot-taps. It is designed to be installable and removable in subsea environments using robots or remote manipulators.

Figure 1:
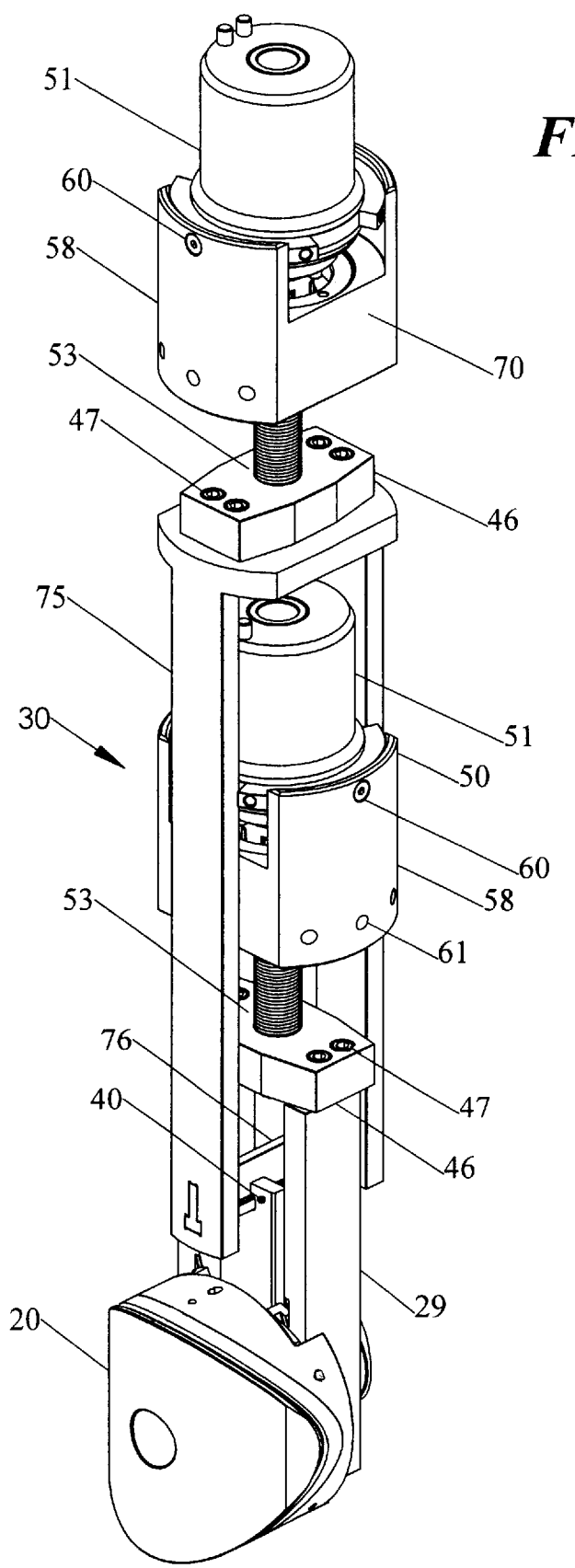
FIG. 1 is an oblique view of a sealing plug assembly and its actuators removed from its housing.
Figure 2:
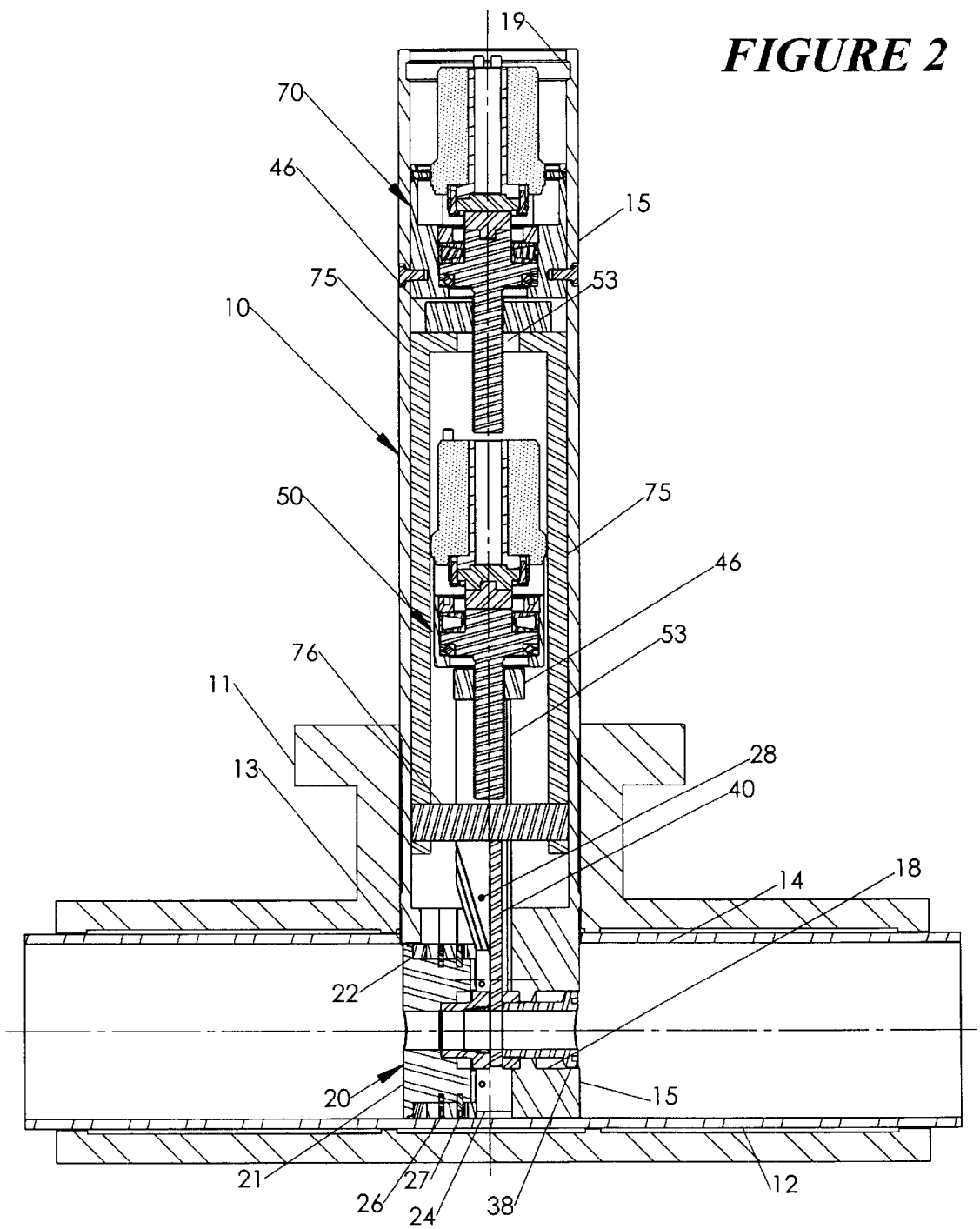
FIG. 2 illustrates a longitudinal cross-sectional view of a line stopper assembly inserted into a pipeline having a hot-tap fitting with the sealing plug assembly retracted in the line stopper housing.

Referring now to the drawings, and initially to FIGS. 1 and 2, it is pointed out that like reference characters designate like or similar parts throughout the drawings. The Figures, or drawings, are not intended to be to scale. For example, purely for the sake of greater clarity in the drawings, wall thickness and spacing are not dimensioned as they actually exist in the assembled embodiment.

In order to be set, this novel line stopper is initially deployed into the pipeline from a pressure-containing deployment chamber (not shown) coaxially affixed to an isolation valve (not shown) which is in turn coaxially attached to the outer flange of the neck of the hot-tap fitting. This method of deployment is well known to those in the pipeline repair industry. The hot tap fitting may be of the type shown in copending U.S. patent application entitled "Pressure Containing Plug for a Tubular Passageway" filed on Jan. 8, 2002 and incorporated herein by reference.

Referring now to FIGS. 1 and 2, the line stopper assembly 10 comprises a housing 15 and an actuated plug assembly 30. The activated plug assembly 30, shown in FIG. 1, comprises a sealing plug assembly 20, a pair of driving wedges 28 and 29, a wedge actuator 50, a valve gate 40, a gate driving fork 75 and a gate valve actuator 70.

The neck of the hot-tap fitting, the isolation valve, and the outlet end of the deployment chamber have substantially the same bores which serve as guides for positioning the line stopper. The initial configuration of the line stopper assembly for deployment into the hot-tap fitting can be seen in FIG. 2. The overall line stopper assembly 10 is deployed through the neck of a flanged hot-tap fitting 11 which is affixed around a pipeline 12. A circular cross-section transverse window 13 having a projected diameter equal to or slightly more than that of the pipe bore 14 is pre-cut into the pipe using a hole saw in order to admit line stopper assembly 10 into the bore of the pipe. The line stopper assembly 10 is prealigned so that a bypass bore through the sealing plug assembly 20 and the line stopper is coaxial to the axis of pipeline 12. The sealing plug assembly 20 is retracted into the housing 15 of the line stopper assembly 10 to allow deployment of the line stopper assembly 10 into the neck of the hot-tap fitting 11. The line stopper assembly 10 is inserted through the hot-tap fitting until its bottom end hits the distal interior wall of the pipeline 12. At that point, the sealing plug assembly 20 is extended upstream out of the housing 15 and into the pipe bore 14 and the elastomeric seal 22 of the sealing plug assembly 20 is biased against the pipe bore 14 to seal therewith. Once the sealing plug assembly 20 is aligned properly in the pipe bore and sealed against the pipe bore 14, the valve gate 40 is forced downwardly to close the bypass valve and complete the installation of the line stopper.

Figure 3:
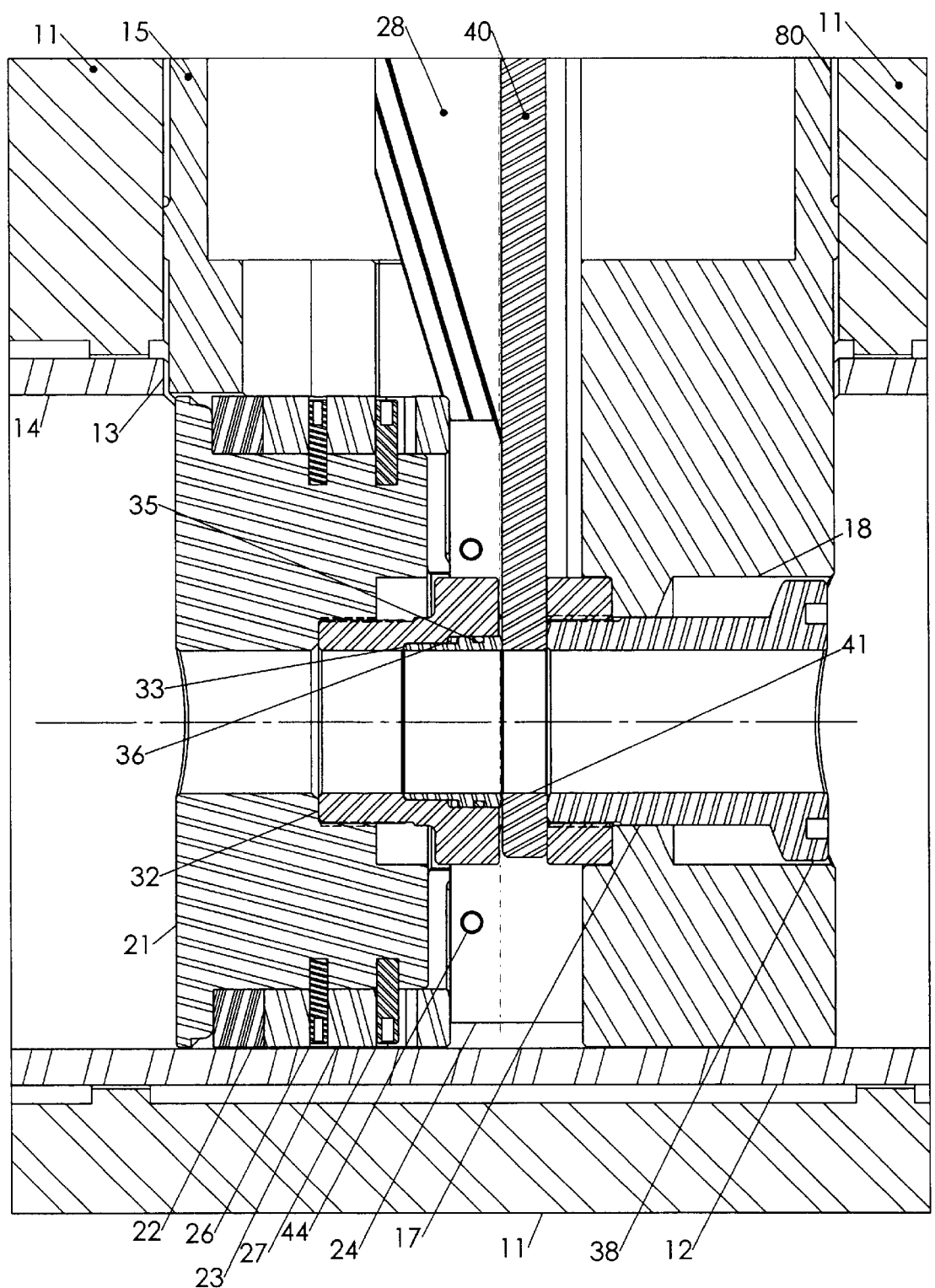
FIG. 3 is a closeup view of the sealing plug assembly as shown in FIG. 2.
Figure 9:
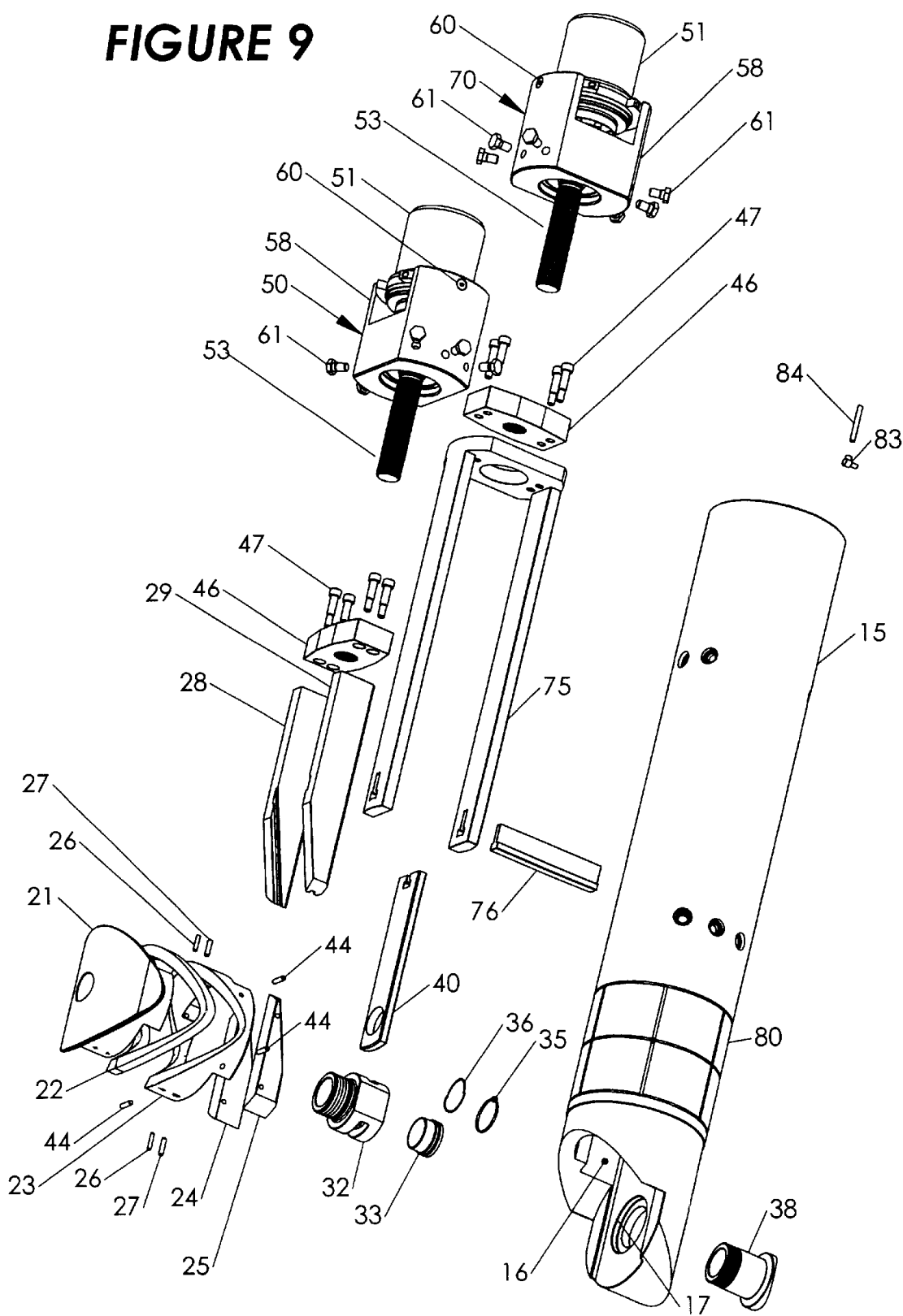
FIG. 9 is an exploded view of the line stopper assembly of FIG. 8.

The cylindrical tubular housing 15, illustrated in FIGS. 2, 8 and 9 of the line stopper assembly has a concentrically bored upper cylinder which houses the gate valve actuator 70 and the wedge actuator 50, a relatively thick transverse bulkhead with penetrations for both closely fitting passage of and guidance of the actuated reciprocable operator parts of the sealing plug assembly 20, and a transverse cylindrical pocket 16 to house the sealing plug assembly 20. The parts guided for their reciprocating operational movements within housing 15 include wedges 28 and 29. Valve gate 40 is also guided by housing 15 in the lateral direction transverse to the axes of housing 14 and pipeline 12. The lower end of housing 15 is rounded to substantially match the curvature of the bore 14 of pipeline 12. Concentric with and intersecting the pocket 16 in housing 15 is through bore 17, which has an outer counterbore 18 opposite the pocket 16. Counterbore 18 has a partially spherical inner end, as shown in FIG. 3. At the upper outer end of housing 15 is interior groove 19, by which a latchable rod-type manipulator or other suitable manipulator means (not shown) mounted in the deployment chamber may be engaged with the line stopper assembly 10 in order to force it inwardly toward the pipeline or outwardly toward its deployment chamber. Housing 15 is a close slip fit in the neck of hot-tap fitting 11.

Figure 4:
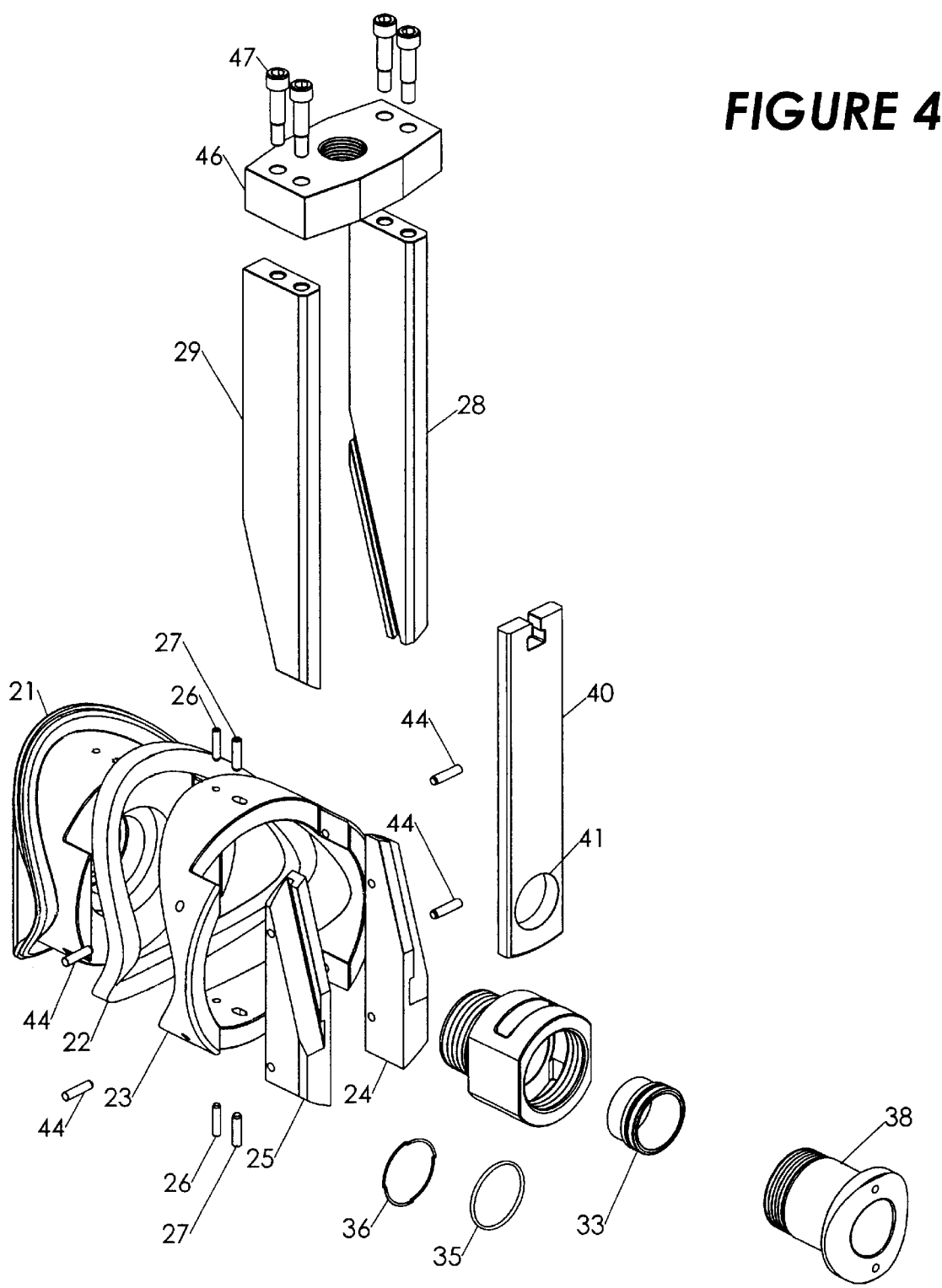
FIG. 4 shows an exploded view of the sealing plug assembly.
Figure 5:
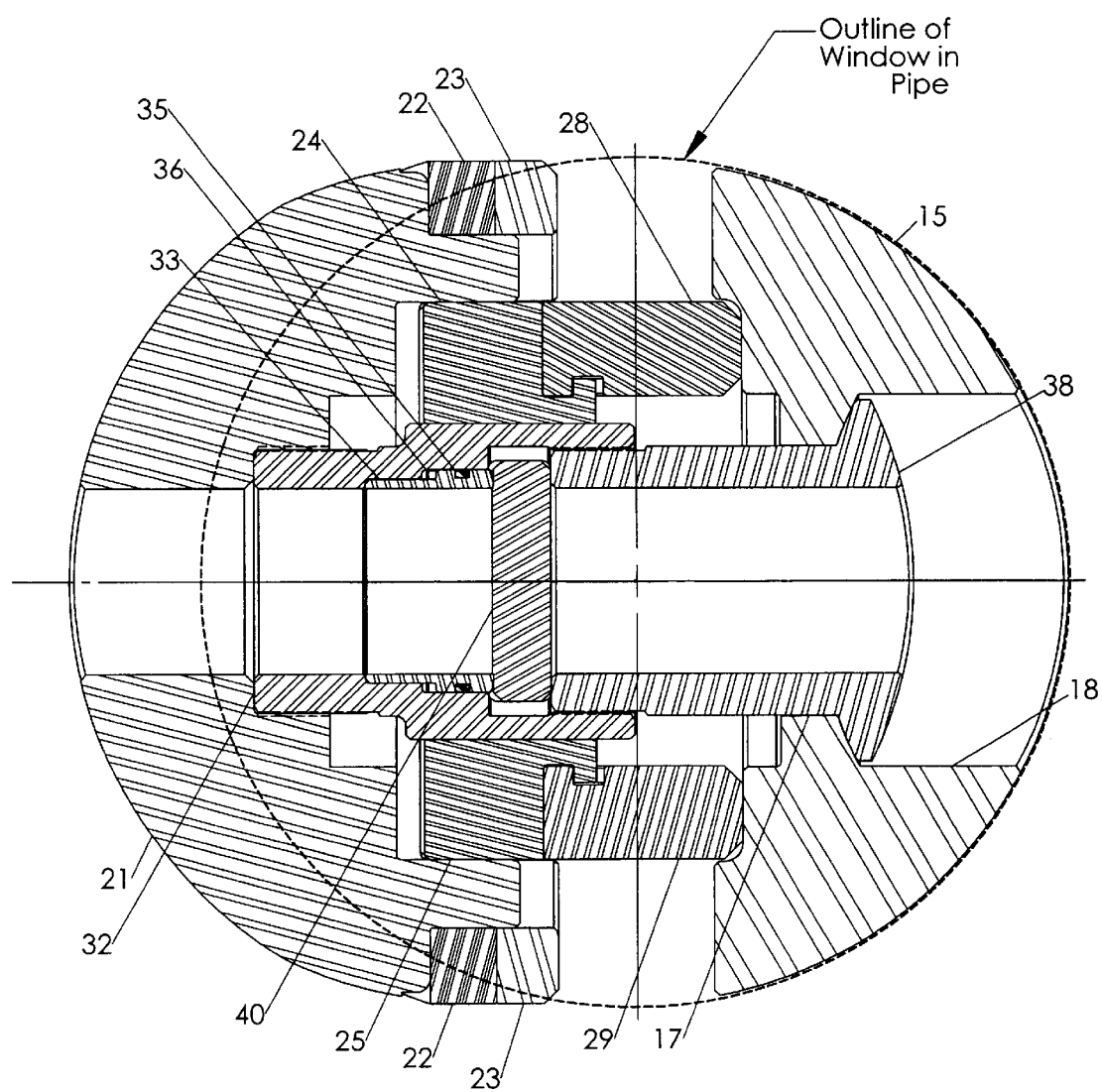
FIG. 5 is a horizontal transverse cross-sectional view taken along line 5—5 of FIG. 8.

FIGS. 3 and 4, as well as the plug midheight horizontal section (cut normal to the centerline of housing 15 and the hot-tap bore) shown in FIG. 5, illustrate the component parts of the sealing plug assembly 20. Sealing plug assembly 20 is configured to fully recess within the cylindrical pocket 16 of housing 15 until such time as it is extended into the pipeline bore 14.

Sealing plug assembly 20 comprises main plug 21, seal ring 22, pusher ring 23, wedges 23 and 24, pins 26, 27 and 44, and gate valve components 32, 33 and 38. The sealing plug assembly 20 has a first exposed external surface composed of main plug 21. This first external surface is approximately cylindrical with an axis parallel to and with a slightly larger diameter than that of housing 15, but with the outer portions of the face relieved slightly for clearance when retracted into housing 15 and in the neck of hot-tap fitting 11. As viewed down the axis of the pipeline 12, the second external surface of the components of sealing plug assembly 20 is cylindrical with a diameter slightly less than that of pipeline bore 14 so that the plug may be inserted readily into bore 14. The axis of the second external surface of sealing plug 20 is coaxial with pipeline 12 when the line stopper assembly is installed. The component exposed in the second external face of the plug assembly 20 are main plug 21, seal ring 22, and pusher ring 23, and reaction wedges 24 and 25.

Main plug 21 has a cylindrical through flow passage parallel to and, when installed, colinear with the axis of pipeline bore 14. This axial flow passage has a first counterbore with a female thread and then a larger second counterbore on its inner end. Set back by a constant distance from the vertical axis of the first external surface of main plug 21, the cylindrical face and its extension of the first external surface of main plug 21 is a transverse (i.e., generated by radii perpendicular to the axial flow passage) shoulder 31 which intersects the second external cylindrical surface of main plug 20, which has a diameter less than that of the second external surface of plug 21 and which is coaxial with the axial flow passage. This transverse shoulder 31 forms one side of a seal groove, while the reduced diameter cylindrical surface shank forms the inner cylindrical side of the seal groove. The outward portion of the transverse shoulder has a narrow, shallower subgroove with a radiused corner between the transverse shoulder 31 and the bottom of the subgroove. The inner end face of the reduced diameter cylindrical surface shank of main plug 21 is transverse to the axial flow passage and has a wide vertical rectangular cross-section central notch. Two opposed coaxial blind vertical holes are on the shank for engagement of shear pins 26, if required. Additionally, two other opposed coaxial blind vertical holes are located inwardly on the shank for either pressed-in or threaded keeper pins 27.

Rectangular cross-section elastomeric seal ring 22 is molded to fit without distortion over the reduced diameter cylindrical surface and to shoulder against the transverse shoulder 31 of main plug 21. The thickness of elastomeric seal ring 22 in the direction of the axial flow passage axis is constant, and the outer diameter of ring 22 corresponds to that of main plug 21 or is slightly less. A corrugated antiextrusion ring of the type, described in copending U.S. patent application, Ser. No. 09/788,970 filed Feb. 19, 2001 entitled "Antiextrusion Device," may be molded integrally with seal ring 22.

Pusher ring 23 is a cylindrical sleeve with a bore which very closely fits over the reduced diameter shank cylindrical surface of main plug 21 and has an outer diameter which corresponds to that of main plug 21. The outer end of pusher ring 23 is cut so that it could mate with the transverse shoulder of main plug 21, but instead it mates with the inner transverse face of seal ring 22. The inner end of pusher ring 23 is transverse to the cylindrical axis of the ring and has a similar vertical rectangular central notch with the same width as that of main plug 21. When the unstressed elastomeric seal ring 22 and the pusher ring 23 are assembled onto the cylindrical shank of main plug 21, the transverse end of the central notch of main plug 21 is recessed (i.e., deeper) relative to that of pusher ring 23. This recessing of the central notch of main plug 21 is to avoid interference with reaction wedges 24 and 25 when the seal ring 22 is compressed. Two per side or more mirror-image horizontal pin holes are drilled through the ears on the inner extensions flanking the central notch of pusher ring 23. Pusher sleeve 23 has two coaxial vertical through holes for shear pins 26 with the same diameter and coaxial with the shear pin holes in main plug 21 when the uncompressed seal ring 22 and the pusher ring 23 are positioned on the shank of main plug 21. Additionally, pusher sleeve 23 has two coaxial parallel vertical slots with the same diameter as the keeper pins 27 for the keeper pins. The outer end of the slots is aligned with the keeper pins 27 when the uncompressed seal ring 22 and the pusher ring 23 are positioned on the shank of the main plug. The length of the slots, which extend toward the inner end of pusher ring 23, is equal to or slightly larger than the maximum anticipated seal compression stroke required.

A righthand reaction wedge 24 has a mirror-image counterpart lefthand reaction wedge 25. The reaction wedges are basically alike, so only wedge 24 will be described. Wedge 24 has parallel vertical sides and a vertical transverse front face. The outer side of wedge 24 comates against the inside lateral face of the notch of pusher ring 23, while its front face abuts the inside transverse face of the notch of pusher ring 23. Multiple holes in reaction wedge 24 comate with those horizontal pin holes of pusher ring 23 permitting pinning wedge 24 into the notch of pusher ring 23 by using multiple cylindrical pins 44. Alternately, the two parts 23 and 24 may be joined with machine screws or countersunk bolts. The top and bottom ends of wedge 24 are cut in circular arcs to match the outer diameter of the cylindrical body of pusher sleeve 23. The back face of wedge 24 has a fall or partial face for compressive sliding contact of wedging, along with an integral key parallel to the tapered face and spaced apart from that face. The integral key has an L-shaped pattern, wherein the attached leg of the L has a width narrower than the main wedge and projects parallel to the axis of pipeline 24 off the back face of the wedge 24 on its inward side. The unattached leg of the L is parallel to the wedging back face of the wedge and projects outwardly to function as an integral key. The pusher ring 23 and reaction wedges 24 and 25 alternately may be combined in a single one-piece construction.

Two identical shear pins 26 are used to pin the pusher sleeve 23 to the main plug 21 through the holes provided in those parts. The shear pins 26 hold pusher ring 23 in a position so that seal ring 22 is uncompressed until pins 26 shear. Shear pins 26 closely fit into their holes. Two keeper pins 27 mount in the holes provided in the shank of main plug 21 and serve to guide and limit the seal compressing stroke of pusher sleeve 23 after shear pins 26 shear by abutting the ends of the slots in the pusher sleeve. The outer ends of keeper pins fit 27 with a slip fit in the slots. A secondary function of the keeper pins 27 is to compel main plug 21 to be retracted whenever the pusher sleeve 23 is retracted.

Figure 10:
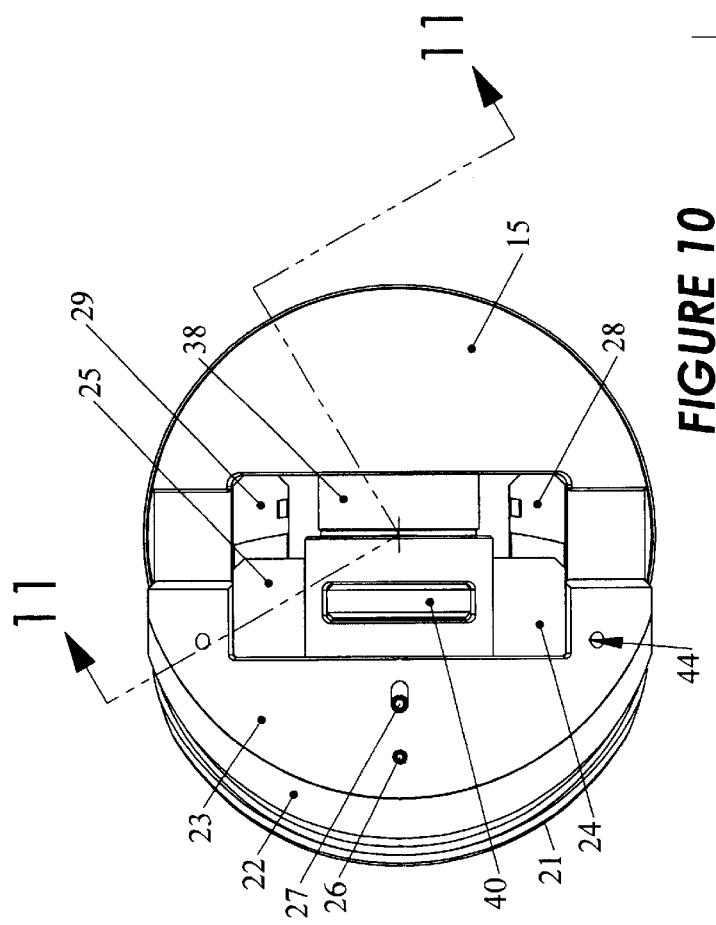
FIG. 10 is a bottom view of FIG. 8.

A righthand driving wedge 28 has a mirror-image counterpart lefthand driving wedge 29. Since driving wedges 28 and 29 are basically alike, only righthand driving wedge 28 will be described. Wedge 28 is a vertical rectangular prism with a short face slightly inclined from the vertical to produce a downward taper for wedging on its forward lower edge. The taper angle of driving wedge 28 corresponds to that of reaction wedge 24. The inclined forward face of righthand driving wedge 28 is configured to comate with the inclined back face of righthand reaction wedge 24 to provide a primary wedging surface, as seen most clearly in FIGS. 5 and 10. On the inboard face of wedge 28 is a groove parallel to and spaced apart from the inclined face. The integral keyway of wedge 24, which consists of the unattached leg of the L on the back face, is engaged in this groove. Accordingly, the inside (forward) face of the unattached leg of the L of reaction wedge 24 is also able to contact the rear face of the groove of driving wedge 28 so that the wedging action may also occur on that interface. This contact resulting from the interkeying of wedges 24 and 28 provides a secondary wedging surface. Thus when the two wedges 24 and 28 are comated so that the two wedges can reactively transmit normal forces on either their comating primary wedging surfaces or alternatively their parallel interkeyed secondary wedging surfaces and thereby remain comated when driving wedge 24 is moved either up or down. The upper end of righthand driving wedge 28 has multiple vertical drilled and tapped holes for the attachment of driving means for the wedge system.

Gate valve housing 32 has a stepped cylindrical external profile coaxial with the through flow passage in main plug 21. The smaller diameter end of gate valve housing has a male thread which is screwed into the female thread in the bore of main plug 21. A vertical passage of rectangular form passes transversely through both the upper and lower walls of the larger cylindrical portion of gate valve housing 32 for admitting a rectangular cross-section valve gate 40. The bore of gate valve housing 32 has, starting from the threaded external end, a short smooth concentric bore, a short first counterbore, a short and larger second counterbore which ends at the start of the vertical gate passage, and a still larger female threaded third counterbore.

Gate valve seat 33 is an annular ring with a stepped external cylindrical shape with a constant through bore. A male O-ring groove is positioned on the larger of the outer cylindrical faces and O-ring 35 is mounted therein. The larger transverse end of gate valve seat 33 is lapped flat so that it can face seal against the gate. Because its outer diameter where O-ring 35 seals is larger than the effective face sealing diameter, the gate valve will be pressure-biased against the gate 40 by pressure from the main plug 21 side. Wave spring 36 shoulders against the transverse wall between the first and second counterbores in gate valve housing 32 on one side and the external intermediate shoulder on gate valve seat 33 on the other side to spring-bias the valve seat 33 against gate 40. Although it is not shown here, a similar seat can be emplaced at the gate end of gate valve end 38 on the opposite side of the gate 40 to effect sealing from that side as well.

Gate valve end 38 has a stepped cylindrical configuration with a uniform coaxial through bore. The exterior has, from the gate end, a male thread at one end which is threadedly engaged into the female thread of the gate valve housing 32, an adjacent straight cylindrical shank, a spherical transition shoulder having the same diameter as that of the spherically-bottomed counterbore 18 and comatable therewith, and a cylindrical head. The diameters of the cylindrical shank and the head are respectively slightly less than those of the coaxial bore 17 and the counterbore 18 of housing 15, thereby permitting the sealing plug assembly 20 to swivel and centralize when inserted into pipeline bore 14. Spanner wrench holes are provided in the outer end of the head. The outer end of the head is not planar, but rather is a cylindrical segment with a vertical axis and having the same diameter as the housing 15, so that it will not protrude beyond the envelope of the outer diameter of housing 15 when the sealing plug assembly is fully retracted.

Valve gate 40 is of conventional slab construction with a through hole 41, a cylindrical transverse cut bottom end which will conform to and abut the pipeline bore 14 when the valve is closed, and an inverted tee-shaped transverse notch in the top by which the gate may be engaged to be raised from its closed position or lowered from its opened position.

Drive head 46 has a rectangular prismatic shape with large chamfers on its vertical edges and a vertical central through hole with a female thread. Multiple vertical counterbored holes corresponding to the holes in the upper ends of righthand driving wedge 28 and lefthand driving wedge 29 permit insertion of screws 47 for threaded connecting the driving wedges to the lower face of the wedge head.

Figure 6:
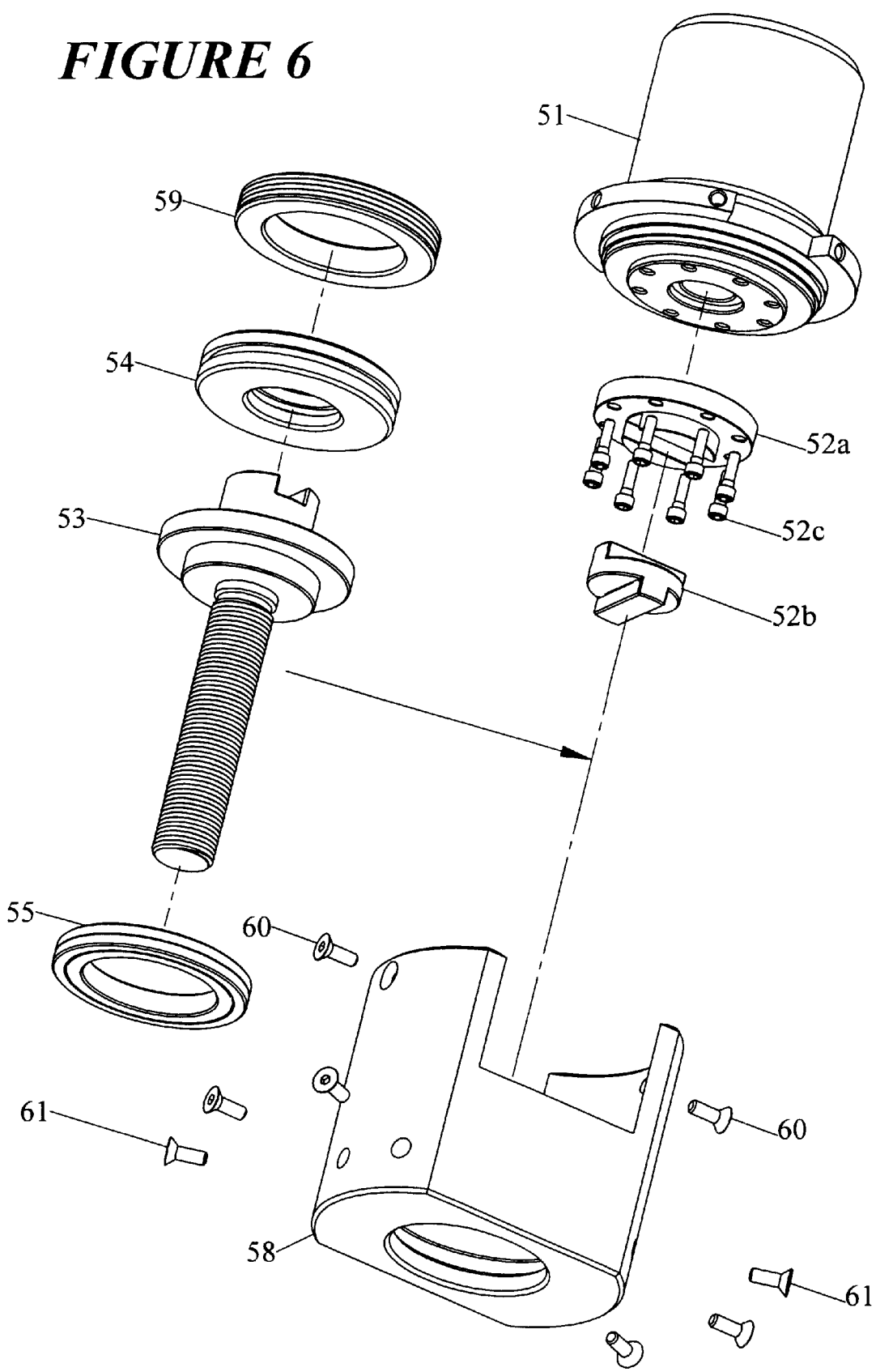
FIG. 6 is an exploded view of the actuator assembly.

The gate valve actuator 70 and the wedge actuator 50 have identical actuator drive assemblies 49. As shown in the exploded view of FIG. 6, each actuator drive assembly consists of a motor 51, a coupling 52 (consisting of components 52a,b,c), a drive screw 53, a first thrust bearing 54, a second thrust bearing 55, a motor support housing 58, a bearing retainer 59, multiple motor mount screws 60, and multiple motor support housing screws 61. Both the wedge actuator 50 and gate valve actuator 70 are mounted coaxially in housing 15, with wedge actuator 50 mounted below the gate valve actuator 70 (i.e., closer to sealing plug assembly 20). The two actuator drive assemblies are rotated 90° with respect to each other about the axis of housing 15.

Motor 51 can be either an electric or hydraulic servo motor which provides sufficient torque to run a jack screw 53 capable of enough push or pull to both: a) extend the sealing plug assembly 20 upstream in high pressure conditions and then expand its seal ring 22, or close the gate valve under high pressure flow; and b) retract the sealing plug and seal or open the gate valve under high pressure. The output flange of motor 51 has drilled and tapped mounting holes thereon and is attached to a first coupling disk 52a by coupling mounting screws 52c. First coupling disk 52a is a short cylindrical disk having countersunk mounting holes spaced about its axis for housing the heads and shanks of mounting screws 52c. On the face of first coupling disk 52a opposite that which mounts to the output flange of motor 51 is a diametral central rectangular cross-section keyway slot which can be engaged by second coupling disk 52b. Second coupling disk 52b is a short cylindrical disk with diametral central rectangular male keys projecting from both of its opposed flat faces. These male keys are respectively comatable with the keyways of the first coupling disk 52a and jack drive screw 53.

The jack drive screw 53 has a head with a diametral slot for engaging a male key of the coupling 52b and an upset flange which serves to transfer axial loads to first thrust bearing 54 and second thrust bearing 55. Motor support housing 58 has a cylindrical outer surface which has mirror image flats parallel to the cylindrical axis cut on its sides for flow passage and clearance of other parts.

Motor housing 58 has, from its lower end, a short first bore which provides clearance for screw 53, a first counterbore for housing bearings and the upset head of screw 53, a second and larger counterbore with a female thread, and a third cylindrical counterbore.

The first counter bore of housing 58 supports bearings 54 and 55. The thrust bearings 54 and 55 are housed in motor support housing 58 and threadedly retained in housing 58 by male threaded annular bearing retainer washer 59. The third counterbore of housing 58 also provides a mount for motor 51, which is attached by multiple countersunk motor mount screws 60 which are engaged with the frame of motor 51. The motor housing 58 is in turn mounted to housing 15 by multiple countersunk motor support housing screws 61. The wiring and/or hydraulic tubing for operating motor 51 is not shown, but it would be run upwardly from connections on the upper end of motor 51 to pass through the carrier housing pressure vessel (not shown) which serves as a carrier and housing for line stopper assembly 10 and the apparatus (not shown) for extending and retracting the line stopper. The power source(s), either electrical or hydraulic, and their controls are external to this pressure vessel. The motors are instrumented so that torques and the positions of the screw-driven components can be monitored and controlled in order to achieve proper insertion.

The wedge actuator assembly 50 has the drive screw 53 of the actuator drive assembly threadedly engaged into its threaded drive head 46 so that the driving wedges 28 and 29 can be driven up or down relative to housing 15. Wedge actuator assembly 50 has the flats of its motor support housing 58 positioned transverse to the through hole of sealing plug assembly 20 so that elements of the gate valve actuator 70 may extend past the wedge actuator assembly 50.

The gate valve actuator 70 has the drive screw 53 of its actuator drive assembly threadedly engaged with its drive head 46 which is in turn attached to a gate drive fork 75 by screws 47. Gate drive fork 75 consists of a horizontal transverse head with a central vertical hole clearance to clear the drive screw 53 and relatively long integral mirror-image vertical fork bars which have opposed horizontal transverse coaxial through holes of an inverted tee shape. The transverse head of gate drive fork 75 has cylindrical ends that closely fit to the bore of housing 15 and intermediate flats for flow and wire or tubing passage. The vertical fork bars closely fit between the flats of motor support housing 58 of wedge actuator 50 and the inner wall of housing 15, so that the head is guided by the housing bore. Mounting in and comating with the transverse holes in gate drive fork 75 is an inverted tee-shaped gate crossbar 76. Gate crossbar 76 is in turn engaged in the tee-shaped slot in the top of gate 40. Thus, rotation of the drive screw 53 of the gate valve actuator 70 causes the gate to be driven up or down to operate the bypass valve in the sealing plug assembly 20.

Figure 7:
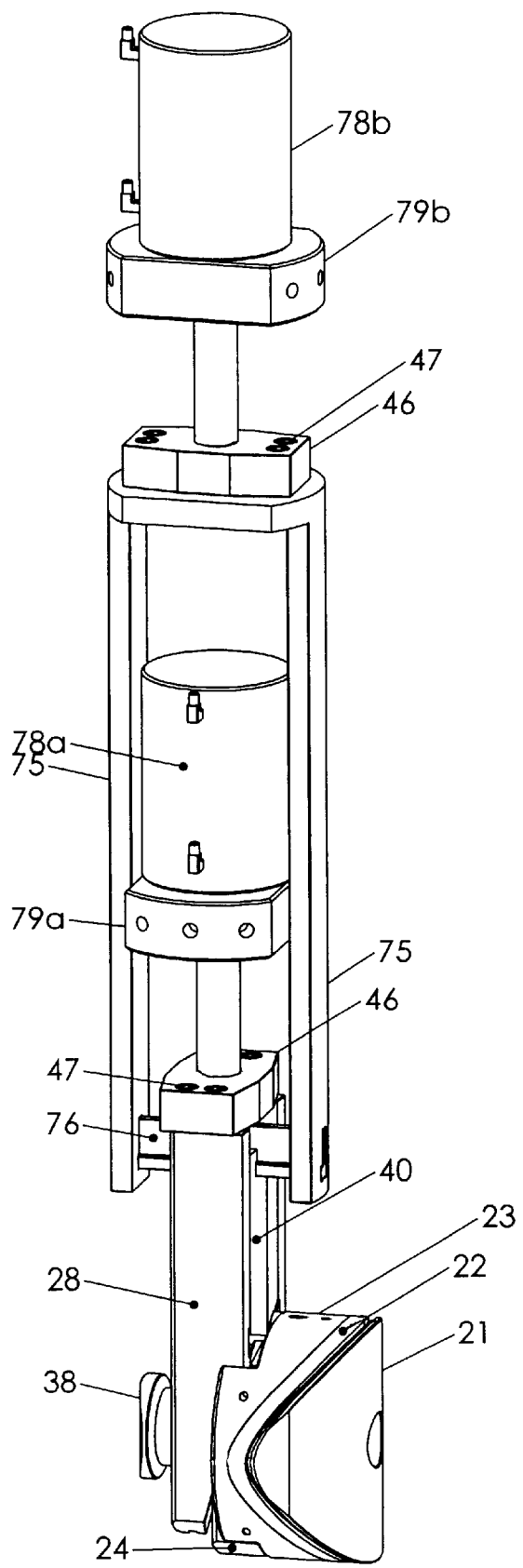
FIG. 7 is an oblique view of a sealing plug assembly and its actuators removed from the line stopper assembly similar to that shown in FIG. 1, but showing alternative driving means for the actuator assemblies.

Alternatively as seen in FIG. 7, the motor-driven actuator drive assemblies described above can be replaced by servo hydraulic cylinders 78*a, b* which are provided with cylinder rod locks. These cylinders are mounted to cylinder supports 79*a, b*, which are similar to the motor support housings 58 and supported by motor support housing screws 61. The rod ends of cylinders 78*a, b* are screwed into the threaded bores of threaded drive head 46 and thereby connected to the driving wedges 28 and 29 and gate drive fork 75, respectively. Cylinders 78*a, b* are instrumented for pressure and stroke position. The pressure supply and control lines (not shown) are mounted to pass through the wall of the carrier housing pressure vessel (not shown) which houses the retracted line stopper assembly 10 similarly to the case for the motor-driven actuators. Cylinders 78*a, b* are shown with each having a single rod, but balanced double rod-ended cylinders may be substituted in order to make the cylinders sensitive to their ambient pressure.

In order to aid insertion of the line stopper assembly 10 into a flowing pipeline 12, the housing 15 is provided with a journal bearing 80, as may be seen in FIGS. 8 and 9. Journal bearing 80 has an array of circumferential and vertical interconnecting flow distributor surface grooves 81 across the portion of its exterior which would experience the highest frictional drag during insertion through the bore in the neck of the hot tap fitting 11. This portion of the housing has a diameter sized to provide a close slip fit in the bore of the neck of hot tap fitting 11. The source of fluid could be from a pump either internal or external to the carrier housing.

Figure 11:
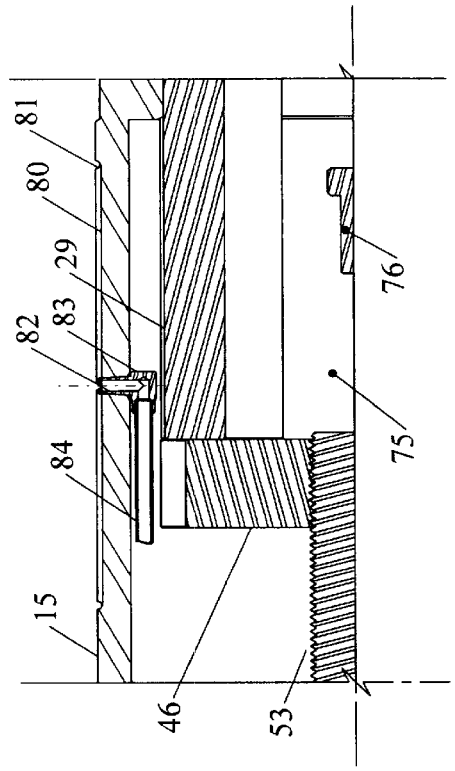
FIG. 11 is a partial longitudinal section through the flow injector shown in FIG. 10.

Referring now to FIG. 11, injection of high pressure fluid through radial flow port 82 in the wall of housing 15 via the interconnected elbow injector fitting 83 and injector feed tubing 84 can provide and maintain a high pressure fluid layer between housing 15 and hot tap fitting 11. With sufficient flow, this fluid layer will support even very high lateral forces on housing 15 without permitting contact between the two sides of the bearing across the interface. Accordingly, the frictional forces to be overcome during the insertion and removal of line stopper assembly 10 under flowing pipeline conditions are significantly reduced, if fluid is injected into the journal bearing 80.

OPERATION OF THE INVENTION

In order to operate the improved line stopper assembly of this invention, it is housed first in a carrier housing pressure vessel (not shown) which provides pressure retention and fluid containment and external power and control to the line stopper assembly 10. Additionally, a drive head is connected by means of latching into internal groove 19 in the upper end of housing 15 so that the assembly can be axially inserted into or withdrawn from the precut window 13 cut into pipeline 12. Normally, an isolation ball valve or gate valve (not shown) is positioned on top of the neck of the hot tap fitting 11, and the carrier housing pressure vessel containing the line stopper assembly 10 is mounted to the outer flange of the valve. The valve is opened to initiate the line stopping operation, and then the line stopper assembly 10 is inserted through the valve and the window in the pipe until housing 15 bottoms in the bore 14 of the pipeline 12, as shown in FIG. 2.

The flow axis of the line stopper assembly 10 is pre-aligned with the axis of the pipeline 12 so that sealing plug assembly 20 may be inserted freely. The line stopper assembly 10 reduces the friction encountered during insertion into the hot tap fitting 11 by injecting fluid into the journal bearing 80 so that there is a fluid interface between housing 15 and hot tap fitting 11. If the line is liquid filled, then that fluid can be used to supply the pump and the bearing 80; if the line is gas filled, then separately provided fluid is used. The resultant fluid layer formed between the housing 15 and the neck bore of the hot tap fitting 11 eases the insertion considerably by reduction of the necessary thrust on the line stopper assembly.

During the insertion of the line stopper assembly into the pipeline, driving wedges 28, 29 are retracted, thereby maintaining the sealing plug assembly 20 retracted into the housing pocket 16, as shown in FIGS. 2 and 3. This position is necessary for permitting passage of the sealing plug assembly 20 through the neck of the hot tap fitting 11. In addition, the valve gate 40 of the gate valve of the line stopper has been left open to reduce fluid forces on the sealing plug assembly 20 and overall linestopper assembly 10 during insertion or retraction.

Figure 12:
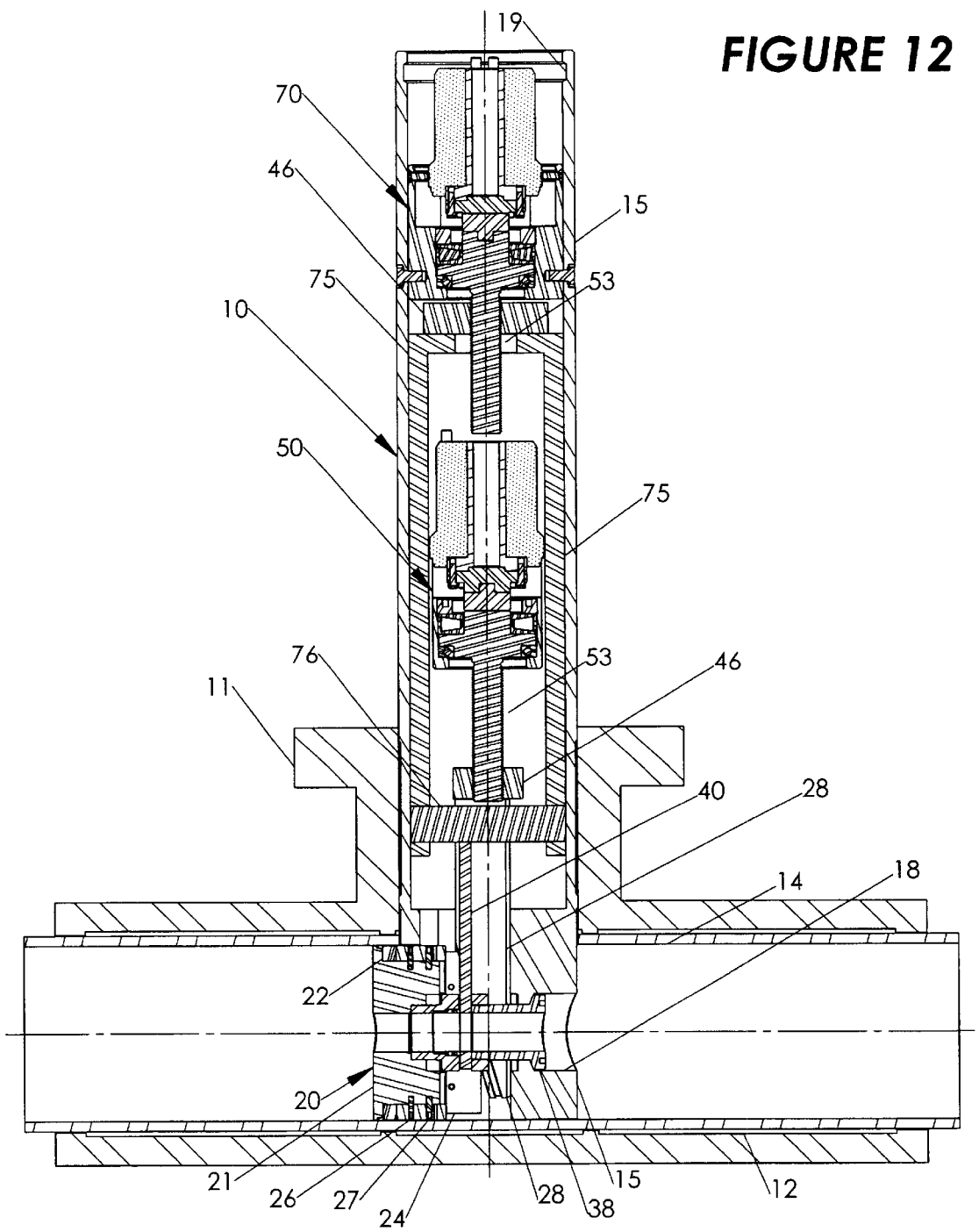
FIG. 12 is a longitudinal sectional view of a line stopper assembly inserted into a pipeline having a hot-tap fitting with the sealing plug assembly extended into the pipeline bore.
Figure 13:
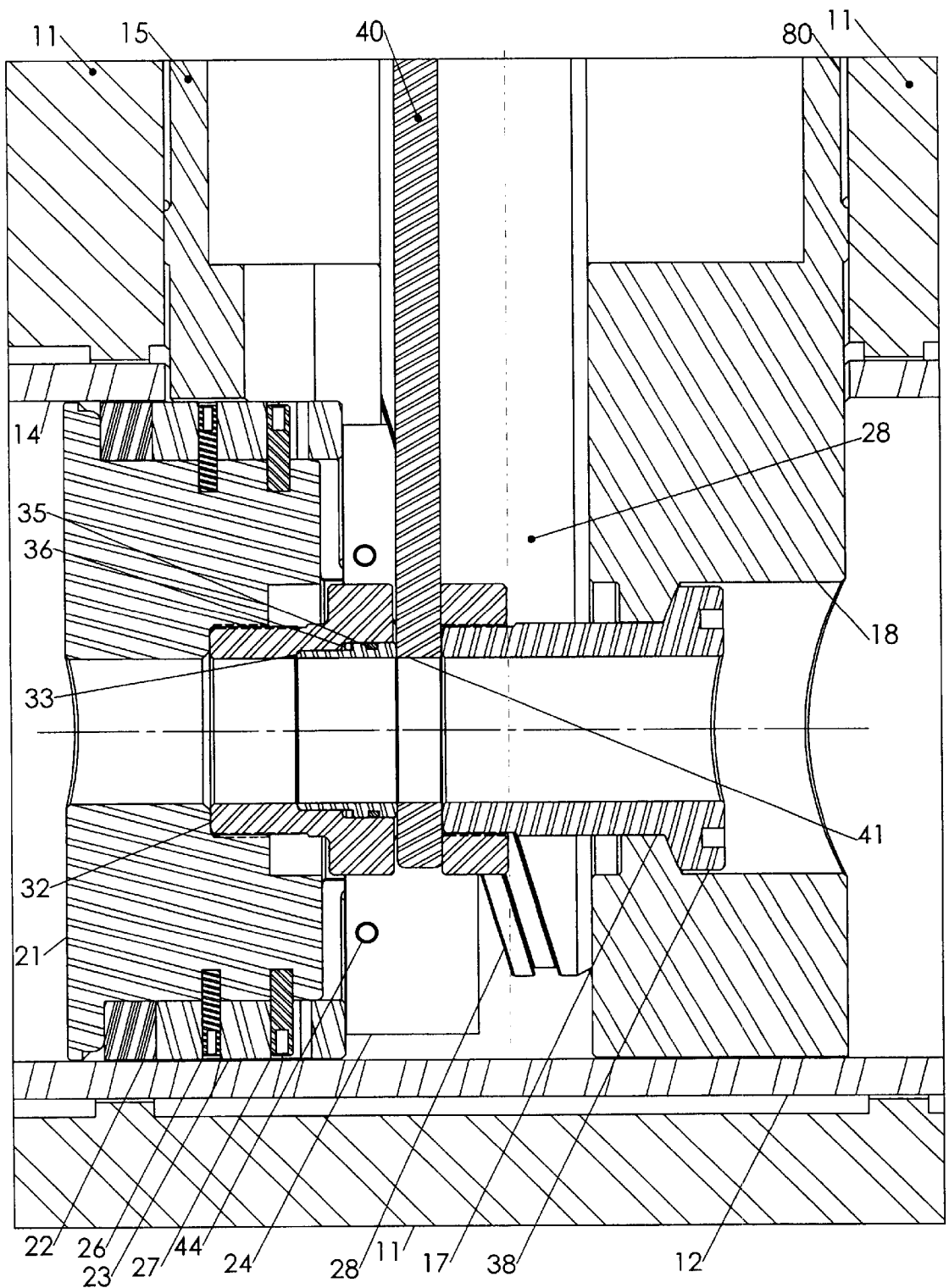
FIG. 13 is a closeup view of the sealing plug assembly as shown in FIG. 12.

The next step is to extend the sealing plug assembly 20, as seen in FIGS. 12 and 13, upstream against the flow by using the wedge actuator 50 to force the driving wedges 28, 29 downwardly so that they coact with reaction wedges 24 and 25, respectively, on the primary wedging surfaces, thus compelling the sealing plug to move outwardly and upstream in the pipeline from its recessed position. The transverse forces from driving wedges 28, 29 are transmitted to reaction wedges 24, 25 and thereby to pusher ring 23, seal ring 22, and main plug 21. The lateral wedge reaction to the transverse forces applied to the sealing plug assembly 20 by driving wedges 28, 29 is supported by the guide slots in the transverse bulkhead and the pocket bottom in housing 15.

In no flow or low flow conditions, shear pins 26 might not be required or used during the extension of the sealing plug assembly 20. If shear pins 26 are not used, the elastomer of seal ring 22 is mildly compressed by pusher ring 23 during insertion into the bore 14 of pipeline 12, but not sufficiently to cause it to rub against the bore 14 of pipeline 12 or encounter burrs at the interior rim of window 13. Main plug 21 will displace some burrs at the inner rim of window 13 in pipeline 12 during this extension.

In the case of high flows, it will be necessary to provide shear pins 26 to temporarily fix pusher ring 23 to main plug 21 during the extension of the sealing plug assembly 20 in order to avoid seal compression and scrub. The combination of shear pin 26 ultimate shear stress and pin diameter is predetermined to be appropriate for the performance described below. During the plug extension into the bore 14, the flow bypassing the extended seal ring 22 on the exterior of the sealing plug assembly tends to remove debris from around the exterior of the seal. Because the fit between the neck of gate valve end 38 and the bore 17 of housing 15 is loose, the sealing plug assembly 20 is free to begin centralizing in bore 14 of pipeline 12. When sealing plug assembly 20 is fully extended, the spherical transition shoulder on the head of gate valve end 38 abuts the spherical bottom of counterbore 18 in housing 15, thereby preventing further extension. At this point, the driving wedges 28, 29 are not fully extended.

Additional downward movement of driving wedges 28, 29 after the gate valve end 38 abuts housing 15 causes pusher ring 23 to be driven farther forward from its initial position, thereby compressing the seal ring 22 between the stationary main seal plug 21 and the pusher ring 23. If shear pins were used to temporarily connect main plug 21 and pusher ring 23 to prevent excessive compression of seal 22 during the first extension stage, they are sheared by the increased wedge actuator forces applied after full extension of sealing plug assembly 20. The axial compression forces on the seal 22, from the movement of pusher ring 23 relative to main plug 21, cause the seal 22 to radially expand and forcibly bear against the interior bore 14 of the pipeline 12 to effect a seal. The radial forces on the seal 22 cause the main plug 21 to centralize in the bore 14, since the comating spherical surfaces on the travel stop provided by the counterbore 18 of housing 15 and gate valve end 38 permit swiveling of the sealing plug assembly 20. Non-concentricity of the sealing plug 21, ovality and other pipe bore irregularities are accommodated by the overflow of elastomer from seal 22 into the subgroove of main plug 21, so that the elastomer of seal ring 22 is not cut. The thrust applied to the driving wedges 28, 29 is monitored to ensure that sufficient seal preload is provided and maintained for the anticipated operational pressure. The preload provided on the seal provides a bi-directional sealing such that the seal can retain pressure applied from either side of the seal. If necessary because of a large bore clearance, the driving wedges 28, 29 can be driven downwardly until they contact the bore 14 of pipeline 12.

Figure 14:
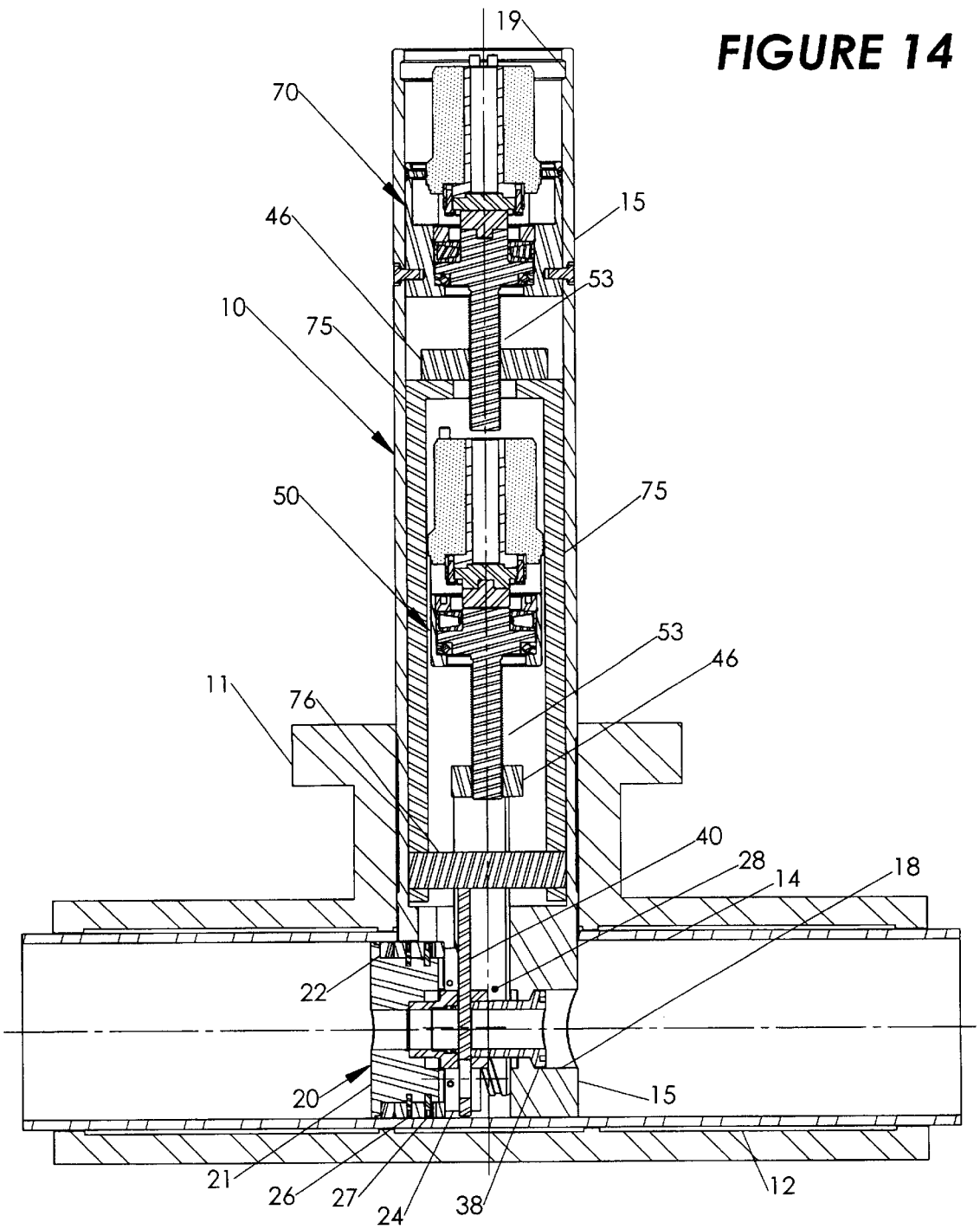
FIG. 14 is a longitudinal sectional view of a line stopper assembly with the sealing plug assembly extended into the pipeline bore and the gate closed.
Figure 15:
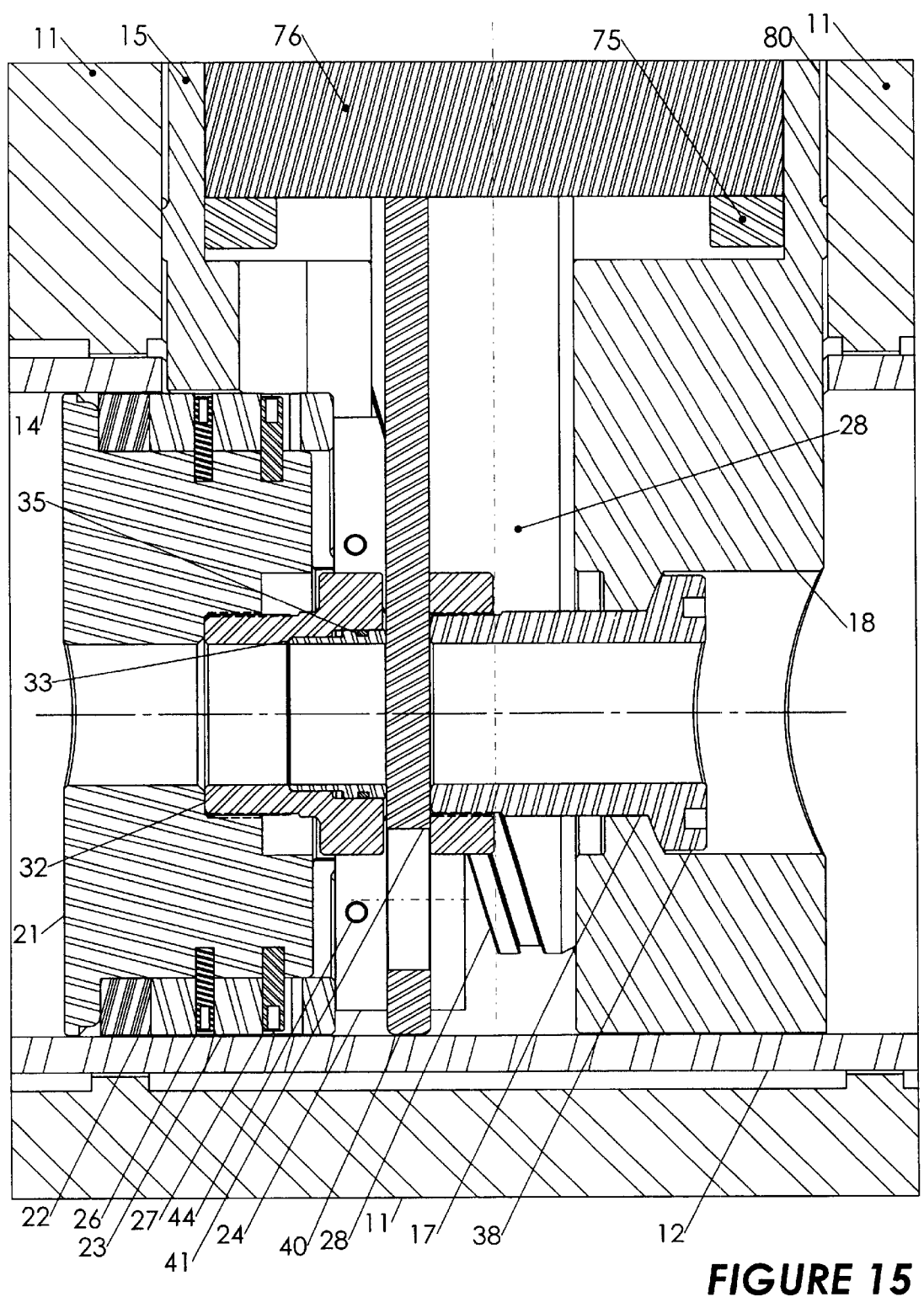
FIG. 15 is a closeup view of the sealing plug assembly as shown in FIG. 14.

Following establishment of the seal against the pipe, the gate valve actuator 70 is activated to apply downward force to the gate 40 to move it to its closed position, as shown in FIGS. 14, 15 and 16. The reaction force and position of gate 40 are monitored to ensure full closure. At this point, the line stopper assembly is fully installed.

Retrieval of the line stopper assembly involves reversing the installation sequence. During the retraction of driving wedges 28, 29, the interlocking of the driving wedges with the reaction wedges 24, 25 by means of the integral keying of the reaction wedges permits wedging action to occur on the secondary wedging surfaces. In other words, the wedges are push-pull wedges due to their ability to wedge the sealing plug assembly 20 both outwardly and inwardly from, respectively, downward and upward motion of driving wedges 28 and 29. Thus, the upward motion of wedges 28 and 29 compels the pusher ring 23 to retract, since pins 44 tie reaction wedges 24, 25 to pusher ring 23. The travel limiting means provided by stop pins 27 mounted in main plug 21 and acting in the comating slots of the pusher ring 23 can be used to cause pusher ring 23 to engage main plug 21 and compel it to fully retract. This pusher ring travel limiting is important when the upstream fluid forces against main plug 21 are insufficient to ensure full retraction. Again, the reactive lateral forces on driving wedges 28, 29 are provided by guide slots in the transverse bulkhead in housing 15.

The operation of the line stopper is substantially the same regardless of whether electric motors, hydraulic motors, or hydraulic cylinders or any other type of linear thrust-producing devices are used as actuators. Different arrangements or combinations of actuators may be used without departing from the spirit of this invention.

In addition, a quarter-turn ball valve may be substituted in place of the gate valve by providing an appropriate housing and using the vertical stroke of actuator 70 to rotate the ball stem by means of a linkage, cam, or rack and pinion. For cases when the line is not flowing during installation, valving in the sealing plug assembly 20 may not be required.

Likewise, the seal ring 22 could be bonded to either the main plug 21 or the pusher ring 23 in order to avoid the potential of its being sucked out of its groove by fluid forces. Similarly, the seal 22 could have a trapezoidal cross-section and consistent comating faces on main plug 21 and pusher ring 23 so that it is better entrapped to resist being sucked out of its groove by fluid forces. The seal ring 22 may also be provided with an integral antiextrusion ring on its downstream side to permit service in higher pressure conditions.

ADVANTAGES OF THIS INVENTION

This invention offers several significant advantages over currently available line stoppers in terms of pressure capacity and reliability. Because the insertion of the sealing plug assembly is upstream, rather than downstream as in most other line stoppers, the motion of the plug is controllable so that slamming and impact are avoided.

Provision of the selectively closeable bypass significantly reduces installation forces. Furthermore, the provision of the journal bearing 80 and a fluid interface between the housing 15 and the hot tap fitting 11 helps ensure that the housing will be insertable into the flow stream and retractable without damage and the need for application of excessive insertion or retraction force.

The insertion of the retracted seal 22 into the pipe bore 14 without scuffing prevents damage to the seal surface, thereby providing a more reliable seal contact with the pipe bore 14. In contrast, currently used cup seals are wiped into place across burrs and are often scuffed and damaged. The radial expansion of the seal 22, after passage of the seal past the typically burred rim of the window in the pipeline wall, ensures a tight contact between the seal 22 and the pipe bore 14, markedly enhancing the reliability of sealing. Furthermore, the provision of the overflow groove for the seal, along with the self-centering capability due to the floating sealing plug assembly mounting, permits reliable sealing in oval and irregular pipe. While the seal ring is configured for primarily sealing against upstream pressures, it can also seal against substantial downstream or back pressures.

Recovery of the line stopper assembly is assisted by retained upstream pressure and, after unsealing, flow forces. This is in contrast to the situation with the IPSCO insertable plug or folding plug line stoppers.

The flexibility available for using any type of actuation means is a further advantage. Although the actuators normally are instrumented, the system can be simplified successfully with some attendant loss of control by providing travel stops on the actuators, rather than monitoring position and installation force. For cases where the line stopper may have to be left in place for extended periods, it is readily possible to extend the neck of the hot tap fitting so that a completion plug can be set above the line stopper. This would permit recovery of the isolation ball or gate valve mounted to the neck of the hot tap fitting. Abandonment of the hot tap fitting then would require only unlatching the installation ram from the latch groove in the upper bore of the housing along with concurrent unstabbing of the control and power feeds for the actuators. Latching and connector stabbing are well known arts used with subsea remote operated vehicles and other industrial applications.

It readily may be seen that certain modifications in the basic design of the improved line stopper can be made without departing from the general nature of this invention. For example, a ball valve with its horizontal stem rotated by the vertical stroke of an actuator could be substituted for the bypass gate valve. It readily may be recognized that other minor modifications of a type familiar to those skilled in the art can be made without departing from the spirit of the invention.

What is claimed is:

1. A line stopper apparatus for preventing flow through pipeline bores comprising:
   (a) a substantially tubular housing reciprocable within a hot-tap fitting having a pocket in a longitudinal first side adjacent to a lower end of said housing;
   (b) a sealing plug assembly, said sealing plug assembly having
      a main plug movable in and out of the pocket in the tubular housing along an axis of a bore of a pipeline between an extended position and a retracted position, wherein when said main plug is in said retracted position the main plug is housed within the pocket of the housing; and
      an elastomeric seal, wherein the elastomeric seal is decompressed during insertion into the bore of the pipeline;
   (c) means for moving said main plug between the extended position and the retracted position; and
   (d) means for compressing said elastomeric seal when emplaced in the bore of the pipeline;
   whereby the seal is sealingly biased against a bore of a pipeline to stop fluid flow past the line stopper apparatus.

2. The line stopper apparatus of claim 1, wherein the housing has a through bore, concentric with a housing exterior, said through bore having a longitudinal axis that is normal to and intersecting a central axis of the pocket, and wherein the sealing plug assembly has further comprises:
   a flow path extending through the sealing plug assembly and aligned with the bore of the pipeline; and
   operable valve means having an open position and a closed position, the valve means selectably operated for opening and closing the flow path.

3. The line stopper apparatus of claim 1, further comprising means for injecting fluid into a hydrodynamic bearing formed between an exterior surface of the housing and a bore of a hot-tap fitting.

4. The line stopper apparatus of claim 1, wherein the sealing plug assembly further comprises stop means for limiting the outward movement of the main plug to the extended position.

5. A line stopper apparatus for preventing flow through pipeline bores comprising:
   (a) a substantially tubular housing having a pocket in a first side adjacent to a lower end of said housing and a through bore wherein said through bore has a longitudinal axis transverse to and intersecting a central axis of the pocket;
   (b) a sealing plug assembly, said sealing plug assembly having
      a flow path aligned with the central axis of the pocket and a bore of a pipeline, the flow path extending through the sealing plug assembly;
      a main plug movable between an extended position and a retracted position, wherein when said main plug is in said retracted position the main plug is housed within the pocket of the housing; and
      an elastomeric seal;
   (c) means for moving said main plug between the extended position and the retracted position;
   (d) means for compressing and decompressing said elastomeric seal; and
   (e) reciprocable valve means for opening and closing the flow path.

6. The line stopper apparatus of claim 5, wherein the valve means is a gate valve.

7. The line stopper assembly of claim 5, wherein the valve means is a ball valve.

8. The line stopper apparatus of claim 5, wherein the reciprocable valve means is integrally mounted in the main plug.

9. A line stopper apparatus for preventing flow through pipeline bores comprising:
   (a) a substantially tubular housing having a pocket in a first side adjacent to a lower end of said housing, said pocket having a central axis located on a diameter of said housing, and wherein said housing has a through bore, coaxial with and intersecting the pocket;
   (b) a sealing plug assembly, said sealing plug assembly having
      a flow path aligned with the through bore;
      a main plug movable between an extended position and a retracted position, wherein when said main plug is in said retracted position the main plug is housed within the pocket of the housing;
      an elastomeric seal;
      a pusher ring; and
      a gate housing having a vertical passage, wherein said passage intersects the flow path;
   (c) means for moving said main plug between the extended position and the retracted position;
   (d) means for compressing and decompressing said elastomeric seal;
   (e) a valve gate, said valve gate reciprocable in the vertical passage of the gate housing between an open position where the flow path is open and a closed position wherein the flow path is closed to stop flow through the flow path; and
   (f) means for moving said valve gate between the open position and the closed position.

10. The line stopper apparatus of claim 9, further comprising means for injecting fluid into a bearing formed between the housing and a bore of a hot-tap fitting, whereby injecting fluid into the bearing facilitates the insertion of the line stopper apparatus through the hot-tap fitting.

11. The line stopper apparatus of claim 9, wherein the means for moving said main plug includes one or more sets of comated push-pull wedges and a wedge actuator cooperating with the comated wedges to move the comated wedges in an upward direction or a downward direction, wherein one wedge of each comated set is attached to the pusher ring such that the movement of the attached wedge is translated to the sealing plug assembly.

12. The line stopper apparatus of claim 9, wherein the means for moving said main plug and the means for compressing and decompressing the elastomeric seal includes:
   (a) one or more sets of coacting wedges, wherein:
      each set of wedges consists essentially of a driving wedge and a reaction wedge, said reaction wedge fixed to the pusher ring,
      the driving wedges and the reaction wedges have opposed parallel and offset first and second wedging surfaces, and
      the driving and reaction wedges of each set are operably comated by mutually interposing the driving and reaction wedges so that the first and second wedging surfaces of the driving and reaction wedges of each set of wedges are engageable, and (b) reciprocable driving means for moving the driving wedges;

whereby motion of the driving wedges in a first direction causes operational engagement of the first wedging surfaces of the wedge sets to extend the main plug and compress the seal, and whereby motion of the driving wedges in a second direction opposed to said first direction causes operational engagement of the second wedging surfaces of the sedge sets to retract the main plug and decompress the seal.

13. The line stopper apparatus of claim 12, wherein when the driving wedges are in a lowest downward position an initial movement of the driving wedges in the upward direction urges the pusher ring of the sealing plug assembly away from the elastomeric seal to decompress the elastomeric seal and a subsequent movement of the wedges in the upward direction operates on the sealing plug assembly to move the main plug into the retracted position.

14. The line stopper apparatus of claim 9, wherein the means for moving said main plug and the means for compressing and decompressing the elastomeric seal include:

one or more sets of coacting push-pull wedges, wherein each set consists essentially of a driving wedge and a reaction wedge, the reaction wedge operably connected to the pusher ring of the sealing plug assembly;

a wedge actuator cooperating with the driving wedges to move the driving wedges in an upward direction or a downward direction; and whereby movement of the driving wedge is translated into movement of the pusher ring.

15. The line stopper apparatus of claim 14, wherein the wedge actuator is operated by a comated screw and nut, said screw and nut driven by a rotary motor.

16. The line stopper apparatus of claim 14, wherein the wedge actuator is a hydraulic cylinder with rod locks.

17. The line stopper apparatus of claim 14, wherein the wedge actuator includes an electric rotary motor operably connected to a drive screw connected to the driving wedges.

18. The line stopper apparatus of claim 14, wherein when the driving wedges are in an upmost upward position an initial movement of the driving wedges in the downward direction operates on the sealing plug assembly to move the main plug into the extended position and a subsequent movement of the driving wedges in the downward direction urges the pusher ring of the sealing plug assembly against the elastomeric seal to compress the elastomeric seal and bias the seal against an interior surface of a bore of a pipeline.

19. The line stopper apparatus of claim 18, wherein compression of the elastomeric seal is limited during the initial movement of the driving wedges by one or more shear pins connecting the pusher ring to the main plug, whereby the pusher ring is immobilized and prevented from compressing the elastomeric seal.

20. The line stopper apparatus of claim 19, wherein the secondary movement of the driving wedges shears the shear pins and urges the pusher ring against the elastomeric seal.

21. The line stopper apparatus of claim 14, wherein the wedge actuator is operated by a rotary motor.

22. The line stopper apparatus of claim 21, wherein the rotary motor is hydraulically operated.

23. The line stopper apparatus of claim 9, wherein the means for moving the valve gate includes a gate drive fork and a gate actuator cooperating with the gate drive fork to reciprocably move the valve gate between the open position and the closed position.

24. The line stopper apparatus of claim 23, wherein the gate actuator is a hydraulic cylinder with rod locks.

25. The line stopper apparatus of claim 23, wherein the gate actuator includes an electric rotary motor operably connected to a drive screw and wherein the drive screw is connected to the gate drive fork, whereby the gate drive fork operates on the valve gate to reciprocably move the valve gate between the open position and the closed position.

26. The line stopper of claim 23, wherein the gate drive fork has a forked end comprising spaced-apart furcations, the gate drive fork operating on the valve gate through a gate cross bar, wherein the gate cross-bar connects the spaced apart furcations and is attached to the valve gate, whereby movement of the gate drive fork is translated into movement of the valve gate.

27. The line stopper apparatus of claim 23, wherein the gate actuator is operated by a rotary motor.

28. The line stopper apparatus of claim 27, wherein the rotary motor is hydraulically operated.

29. A line stopper for selectably blocking flow through pipeline bores, said line stopper comprising:

(a) a substantially tubular housing having a pocket in a longitudinal first side adjacent to a lower end of said housing, said pocket located on a housing diameter transverse to a longitudinal axis of the housing;

(b) a through bore at an interior end of the pocket coaxial with the pocket and penetrating to a second side of the housing opposed to the first side, wherein the through bore has a counterbore on an external end of the through bore, the counterbore having a shoulder on an inner end of the counterbore;

(b) a sealing plug assembly, said sealing plug assembly having a main plug reciprocable along a horizontal axis of the pocket between an extended position and a retracted position, wherein when said main plug is in said retracted position the main plug is housed within the pocket of the housing;

an annular elastomeric seal;

a pusher ring; and a coaxial cylindrical extension attached to an inner end of the main plug and reciprocable within the through bore at the interior end of the pocket, said cylindrical extension having an upset head spaced apart from the shoulder of the counterbore when the main plug is in the retracted position and abutting the shoulder of the counterbore when the main plug is in the extended position;

(c) means for moving said main plug along a longitudinal axis of a bore of a pipeline between the extended position and the retracted position; and (d) means for compressing and decompressing said elastomeric seal.

30. A line stopper for selectably blocking flow through pipeline bores, said line stopper comprising:

(a) a substantially tubular housing having a pocket in a first side adjacent to a lower end of said housing, said pocket located on a housing diameter transverse to a longitudinal axis of the housing;

(b) a through bore at an interior end of the pocket aligned with the pocket and penetrating to a second side of the housing opposed to the first side, wherein the through bore has a counterbore on an external end of the through bore, the counterbore having a shoulder on an inner end of the counterbore;

(c) a sealing plug assembly, said sealing plug assembly having
   a main plug reciprocable along a horizontal axis of the pocket between an extended position and a retracted position, wherein when said main plug is in said retracted position the main plug is housed within the pocket of the housing;
   an annular elastomeric seal;
   a pusher ring;
   an aperture constituting a flow passage in the main plug coaxial with the through bore of the housing;
   a valve housing attached to an inner end of the main plug, the valve housing having a first flow passage coaxial with the aperture of the main plug and an intersecting transverse passage;
   a cylindrical extension having an inner flow passage aligned with the through bore of the housing and the aperture of the sealing plug assembly, the cylindrical extension attached to an inner end of the valve housing and reciprocable within the through bore, said cylindrical extension further having an upset head at an outer end of the cylindrical extension, the upset head spaced apart from the shoulder of the counterbore when the main plug is in the retracted position and abutting the shoulder of the counterbore when the main plug is in the extended position;

(d) means for moving said main plug between the extended position and the retracted position;

(e) means for compressing and decompressing said elastomeric seal;

(f) a moveable valving member, said valving member movable between
   a first position where the valving member permits flow through the flow passage of the valve housing, the inner flow passage of the cylindrical extension and the aperture in the main plug; and
   a second position where the valving member interacts with the sealing mechanism of the valve housing to prevent through flow through the aperture, the flow passage of the valve housing and the flow passage of the cylindrical extension; and (g) means for moving said valving member into and out of its first flowing position and its second sealing position.

31. A line stopper for selectably blocking flow through pipeline bores, said line stopper comprising:

(a) a substantially tubular housing having a pocket in a first side adjacent to a lower end of said housing, said pocket located on a housing diameter transverse to a longitudinal axis of the housing;

(b) a through bore at an interior end of the pocket aligned with the pocket and penetrating to a second side of the housing opposed to the first side, wherein the through bore has a counterbore on an external end of the through bore, the counterbore having a shoulder on an inner end of the counterbore;

(c) a sealing plug assembly, said sealing plug assembly having
   a main plug reciprocable along a horizontal axis of the pocket between an extended position and a retracted position, wherein when said main plug is in said retracted position the main plug is housed within the pocket of the housing;
   an annular elastomeric seal;
   a pusher ring;
   an aperture constituting a flow passage in the main plug coaxial with the through bore of the housing;
   a valve housing attached to an inner end of the main plug, the valve housing having a flow passage coaxial with the aperture of the main plug and housing a valving member;
   a cylindrical extension having an inner flow passage aligned with the through bore of the housing and the aperture of the sealing plug assembly, the cylindrical extension attached to an inner end of the valve housing and reciprocable within the through bore, said cylindrical extension further having an upset head at an outer end of the cylindrical extension, the upset head spaced apart from the shoulder of the counterbore when the main plug is in the retracted position and abutting the shoulder of the counterbore when the main plug is in the extended position;

(d) means for moving said main plug between the extended position and the retracted position;

(e) means for compressing and decompressing said elastomeric seal;

(f) a moveable valving member, said valving member movable between
   a first position where the valving member permits flow through the flow passage of the valve housing, the inner flow passage of the cylindrical extension and the aperture in the main plug; and
   a second position where the valving prevents through flow through the aperture, the flow passage of the valve housing and the inner flow passage of the cylindrical extension; and (g) means for moving said valving member into and out of its first flowing position and its second sealing position.

32. The line stopper of claim 31, further comprising means for injecting and distributing fluid between the housing of the line stopper and a bore of a hot-tap fitting, whereby a lubricating fluid layer is established between the housing and the bore, the lubricating fluid layer facilitating reciprocable insertion and retraction of the line stopper within the hot-tap fitting.

33. A line stopper apparatus for stopping fluid flow in pipeline bores, said apparatus comprising:

(a) a substantially tubular housing having at a first end
   a pocket, said pocket having an axis transverse to and intersecting the longitudinal axis of the housing, and
   a housing through bore, said housing through bore concentric with and intersecting the pocket;

(b) a sealing plug assembly having
   a flow path,
   an anterior face,
   a cylindrical shank, and
   a transition shoulder between said anterior face and said shank,
   wherein said plug is reciprocably moveable along an axis of said pocket between an extended position and a retracted position;

(c) an annular elastomeric seal disposed around the cylindrical shank of the plug with a first side of said seal adjacent said transition shoulder;

(d) an annular pusher ring disposed around the cylindrical shank of the plug having an interior side of the pusher ring abutting a second side of the seal opposed to the first side of the seal;

(e) two sets of vertically movable push-pull coacting wedges, each set of wedges consisting essentially of a driving wedge and a reaction wedge, the reaction wedge operably connected to the pusher ring of the sealing plug assembly;

(f) a wedge actuator, the wedge actuator controlling the movement of the wedges in an upward or downward direction, wherein when the wedges are in an upmost upward position an initial movement of the wedges in the downward direction operates on the pusher ring to move the cylindrical plug into the extended position and a subsequent movement of the wedges in the downward direction urges the pusher ring against the elastomeric seal to compress the elastomeric seal and bias the seal against an interior surface of a bore of a pipeline;

(g) a moveable valve gate, said valve gate reciprocable between an up position permitting flow through the flow path and the housing through bore and a closed position preventing flow through the flow path and the housing through bore; and (h) a valve gate actuator, the valve gate actuator operates on the gate to move the gate between the up position and the closed position.

34. The line stopper of claim 33, further comprising means for injecting fluid into a bearing formed between the housing and a bore of a hot-tap fitting, whereby injecting fluid into the bearing facilitates the insertion and removal of the line stopper through the hot-tap fitting.

35. The line stopper of claim 33, wherein the elastomeric seal has an antiextrusion device embedded therein.

36. The line stopper of claim 33, wherein the sealing plug assembly has a seal overflow groove adjacent the transition shoulder and contiguous therewith, such that whenever a circumference of the elastomeric seal is uniformly compressed by the pusher ring to seal against portions of an out-of-round pipeline bore requiring substantially a maximum radial displacement of the seal, the seal overflow groove locally receives laterally displaced seal elastomer from areas of the seal circumference where insufficient radial clearance exists to permit the substantial radial displacement required in other areas of the seal circumference, thereby permitting effective sealing in irregular pipeline bores.

37. A process for stopping fluid flow through pipeline bores, said process comprising:

(a) selecting a sealing plug to insert transversely into the bore of the pipeline through a precut window, said sealing plug including:
  (i) a substantially tubular housing having a pocket in a first side adjacent to a lower end of said housing, said pocket having a central axis located on a diameter of said housing, and wherein said housing has a through bore, coaxial with and intersecting the pocket
  (ii) a sealing plug assembly, said sealing plug assembly having
    an aperture aligned with the through bore;
    a main plug movable between an extended position and a retracted position, wherein when said main plug is in said retracted position the main plug is housed within the pocket of the housing;
    an elastomeric seal;
    a pusher ring; and
    a gate housing having a vertical passage, wherein said passage intersects the aperture;
  (iii) means for moving said main plug between the extended position and the retracted position;
  (iv) means for compressing and decompressing said elastomeric seal;
  (v) a moveable valve gate, said gate moving from an up position where the aperture is open to a closed position wherein said gate is positioned in the passage of the gate housing to close the aperture; and
  (vi) means for moving said gate into and out of the passage;

(b) moving the main plug into the retracted position;

(c) inserting the line stopper through a precut window in the pipeline until a bottom end of the line stopper contacts a lower section of an interior surface of the bore of the pipeline;

(d) moving the main plug to the extended position within the bore of the pipeline;

(e) compressing the elastomeric seal to bias against and engage the interior surface of the bore of the pipeline; and (f) moving the valve gate within the passage of the gate housing and athwart the aperture in the sealing plug assembly to stop fluid flow through the bore of the pipeline.

38. The process of claim 37, further comprising the step of injecting fluid around an outer surface of the housing during the insertion of the line stopper through the precut window and into the bore of the pipeline.

39. The process of claim 37, wherein the step of moving the main plug to the extended position within the bore of the pipeline inserts the main plug upstream or downstream of a fluid flow through the pipeline.

40. A process for inserting and retracting a line stopper in a tubular passageway to stop fluid flow through the passageway comprising injecting and distributing pressurized fluid between a housing of the line stopper and a bore of a hot-tap fitting, whereby a lubricating hydrodynamic bearing fluid layer is established between the housing and the bore, the lubricating fluid layer facilitating reciprocable insertion and retraction of the line stopper within the hot-tap fitting.

41. A line stopper apparatus for preventing flow through pipeline bores comprising:

(a) a substantially tubular housing having a pocket in a first side adjacent to a lower end of said housing and a through bore wherein said through bore has a longitudinal axis which is transverse to and intersects a central axis of the pocket;

(b) a sealing plug assembly, said sealing plug assembly having
  a flow path coaxial with the central bore of the pocket;
  a main plug movable between an extended position and a retracted position, wherein when said main plug is in said retracted position the main plug is housed within the pocket of the housing; and
  an elastomeric seal;

(c) means for moving said main plug between the extended position and the retracted position;

(d) means for compressing and decompressing said elastomeric seal; and (e) reciprocable valve means, integrally mounted in the main plug, for opening and closing the flow path, said valve means having a first open position and a second closed position.

* * * * *